US012558849B2

(12) United States Patent
Kostenko

(10) Patent No.: US 12,558,849 B2
(45) Date of Patent: Feb. 24, 2026

(54) VOLUMETRIC MICROLITHOGRAPHY

(71) Applicant: Photosynthetic B.V., Amsterdam (NL)

(72) Inventor: Alexander Kostenko, Amsterdam (NL)

(73) Assignee: Photosynthetic B.V., Amsterdam (NL)

( * ) Notice: Subject to any disclaimer, the term of this patent is extended or adjusted under 35 U.S.C. 154(b) by 831 days.

(21) Appl. No.: 17/757,230

(22) PCT Filed: Dec. 14, 2020

(86) PCT No.: PCT/EP2020/086056
§ 371 (c)(1),
(2) Date: Jun. 13, 2022

(87) PCT Pub. No.: WO2021/116501
PCT Pub. Date: Jun. 17, 2021

(65) Prior Publication Data
US 2022/0363010 A1    Nov. 17, 2022

(30) Foreign Application Priority Data

Dec. 13, 2019    (NL) ...................................... 2024460

(51) Int. Cl.
B29C 64/393        (2017.01)
B29C 64/129        (2017.01)
(Continued)

(52) U.S. Cl.
CPC .......... B29C 64/393 (2017.08); B29C 64/129 (2017.08); B29C 64/268 (2017.08);
(Continued)

(58) Field of Classification Search
CPC ... B29C 64/393; B29C 64/129; B29C 64/268; B29C 64/286; B33Y 10/00; B33Y 50/02; G03F 7/70416
See application file for complete search history.

(56) References Cited

U.S. PATENT DOCUMENTS

| | | | |
|---|---|---|---|
| 4,575,330 | A | 3/1986 | Hull |
| 2005/0254035 | A1 | 11/2005 | Frankel |

(Continued)

FOREIGN PATENT DOCUMENTS

| | | |
|---|---|---|
| WO | 2011098609 A1 | 8/2011 |
| WO | 2019079010 A1 | 4/2019 |

OTHER PUBLICATIONS

International Search Report and Written Opinion for corresponding International application No. PCT/EP2020/086056; dated Mar. 19, 2021 (16 pages).

(Continued)

*Primary Examiner* — Charles R Kasenge
(74) *Attorney, Agent, or Firm* — Mendelsohn Dunleavy PC; Kevin J. Dunleavy

(57)        ABSTRACT

Systems and methods for volumetric microlithography are described, wherein the method may include receiving a data representation of a 3D target structure and determining a plurality of planes in a volume of a photosensitive medium or in a build volume, each plane of the plurality of planes associated with a respective depth of a plurality of depths in the build volume, the plurality of depths being defined along an optical axis of an exposure system. Each plane may correspond to a possible position of a focal plane of the exposure system. Preferably, the depths in the plurality of depths are mutually different. The photosensitive medium may include an activation compound for initiating a chemical reaction in the photosensitive medium, the activation compound being activatable by light of a first wavelength. In an embodiment, the photosensitive medium may further include an inhibition compound for inhibiting the chemical reaction in the photosensitive medium, the inhibition compound being activatable by light of a second wavelength, different from the first wavelength. The method may also comprise computing, based on a shape of the 3D target (Continued)

structure and, preferably, properties of the photosensitive medium, a sequence of exposure images, where each exposure image of the sequence of exposure images is associated with a plane of the plurality of planes in the build volume. Each exposure image may be associated with light of the first wavelength and/or light of the second wavelength. In an embodiment, the light may be intensity modulated light. The method may further comprise, for each focal plane of the plurality of planes, controlling the exposure system to position a focal plane of the exposure system at the depth in the build volume associated with the respective plane and to illuminate the build volume with the exposure image associated with the respective plane.

22 Claims, 14 Drawing Sheets

(51) Int. Cl.

| | | |
|---|---|---|
| *B29C 64/268* | (2017.01) | |
| *B29C 64/286* | (2017.01) | |
| *B33Y 10/00* | (2015.01) | |
| *B33Y 50/02* | (2015.01) | |

(52) U.S. Cl.
CPC ............ *B29C 64/286* (2017.08); *B33Y 10/00* (2014.12); *B33Y 50/02* (2014.12)

(56) References Cited

U.S. PATENT DOCUMENTS

| | | | |
|---|---|---|---|
| 2016/0067922 A1 | 3/2016 | Voris et al. | |
| 2018/0056603 A1* | 3/2018 | Hensleigh | .............. B33Y 10/00 |
| 2018/0243976 A1 | 8/2018 | Feller | |
| 2019/0019701 A1* | 1/2019 | Hayakawa | .............. G03F 7/091 |
| 2020/0301286 A1* | 9/2020 | Conley | .............. G03F 7/70416 |

OTHER PUBLICATIONS

De Beer, Martin P., et al. "Rapid, continuous additive manufacturing by volumetric polymerization inhibition patterning." Science Advances 5.1 Article eaau8723 (2019): 1-8.
Kryven, Ivan. "Emergence of the giant weak component in directed random graphs with arbitrary degree distributions." Physical Review E 94.1 Article 012315 (2016): (11 pages).
Kryven, Ivan. "Analytic results on the polymerisation random graph model." Journal of Mathematical Chemistry 56.1 (2018): 140-157.
Torres-Knoop, Ariana, et al. "Modeling the free-radical polymerization of hexanediol diacrylate (HDDA): a molecular dynamics and graph theory approach." Soft Matter 14.17 (2018): 3404-3414.
Van Der Laan, Harry L., et al. "Volumetric Photopolymerization Confinement through Dual-Wavelength Photoinitiation and Photoinhibition." ACS Macro Letters 8.8 (2019): 899-904.
Office Action for corresponding Chinese application No. 202080094196.9; dated Apr. 1, 2025 (25 pages).

* cited by examiner

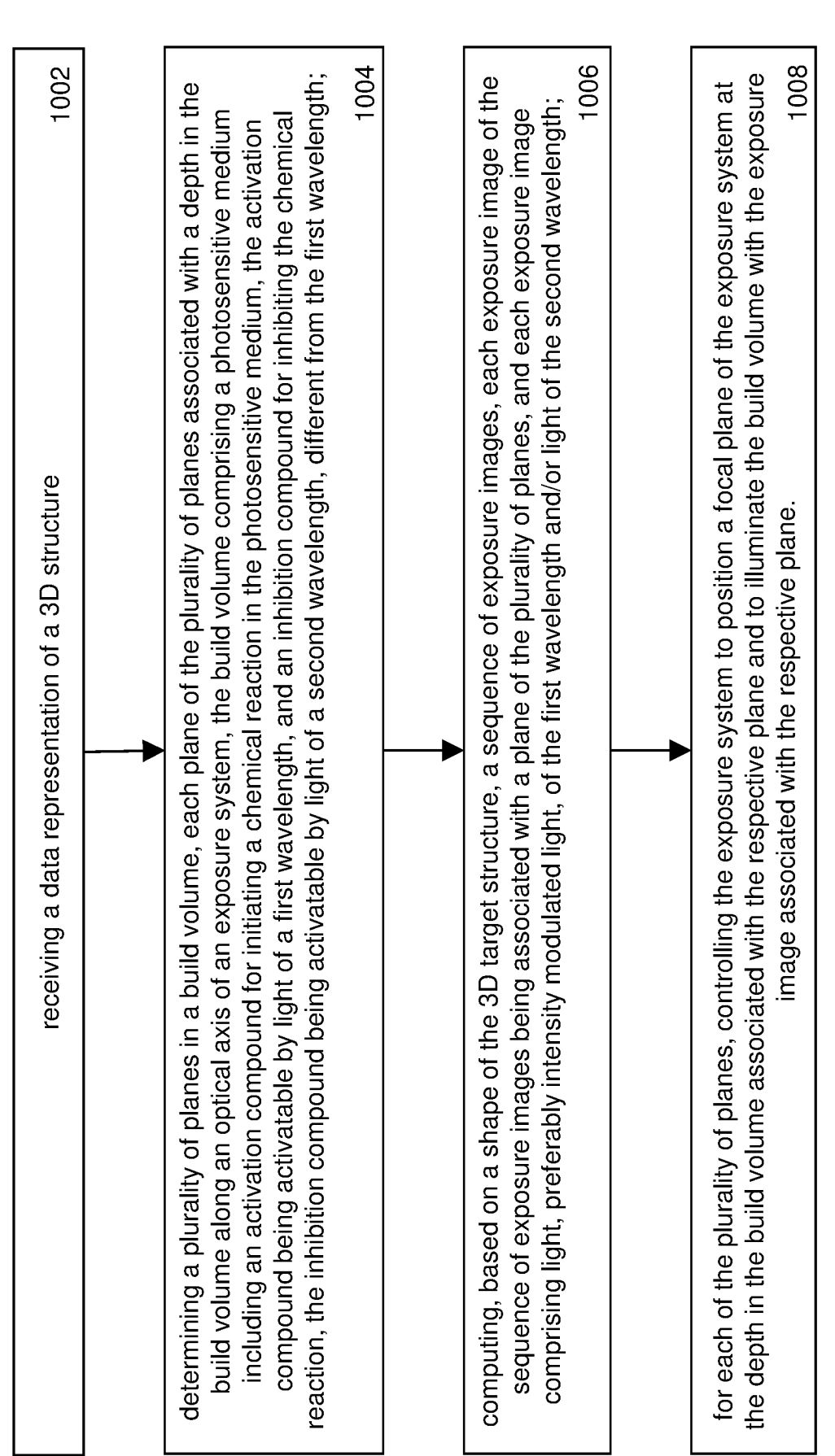

receiving a data representation of a 3D structure

1002 determining a plurality of planes in a build volume, each plane of the plurality of planes associated with a depth in the build volume along an optical axis of an exposure system, the build volume comprising a photosensitive medium including an activation compound for initiating a chemical reaction in the photosensitive medium, the activation compound being activatable by light of a first wavelength, and an inhibition compound for inhibiting the chemical reaction, the inhibition compound being activatable by light of a second wavelength, different from the first wavelength;

1004 computing, based on a shape of the 3D target structure, a sequence of exposure images, each exposure image of the sequence of exposure images being associated with a plane of the plurality of planes, and each exposure image comprising light, preferably intensity modulated light, of the first wavelength and/or light of the second wavelength;

1006 for each of the plurality of planes, controlling the exposure system to position a focal plane of the exposure system at the depth in the build volume associated with the respective plane and to illuminate the build volume with the exposure image associated with the respective plane.

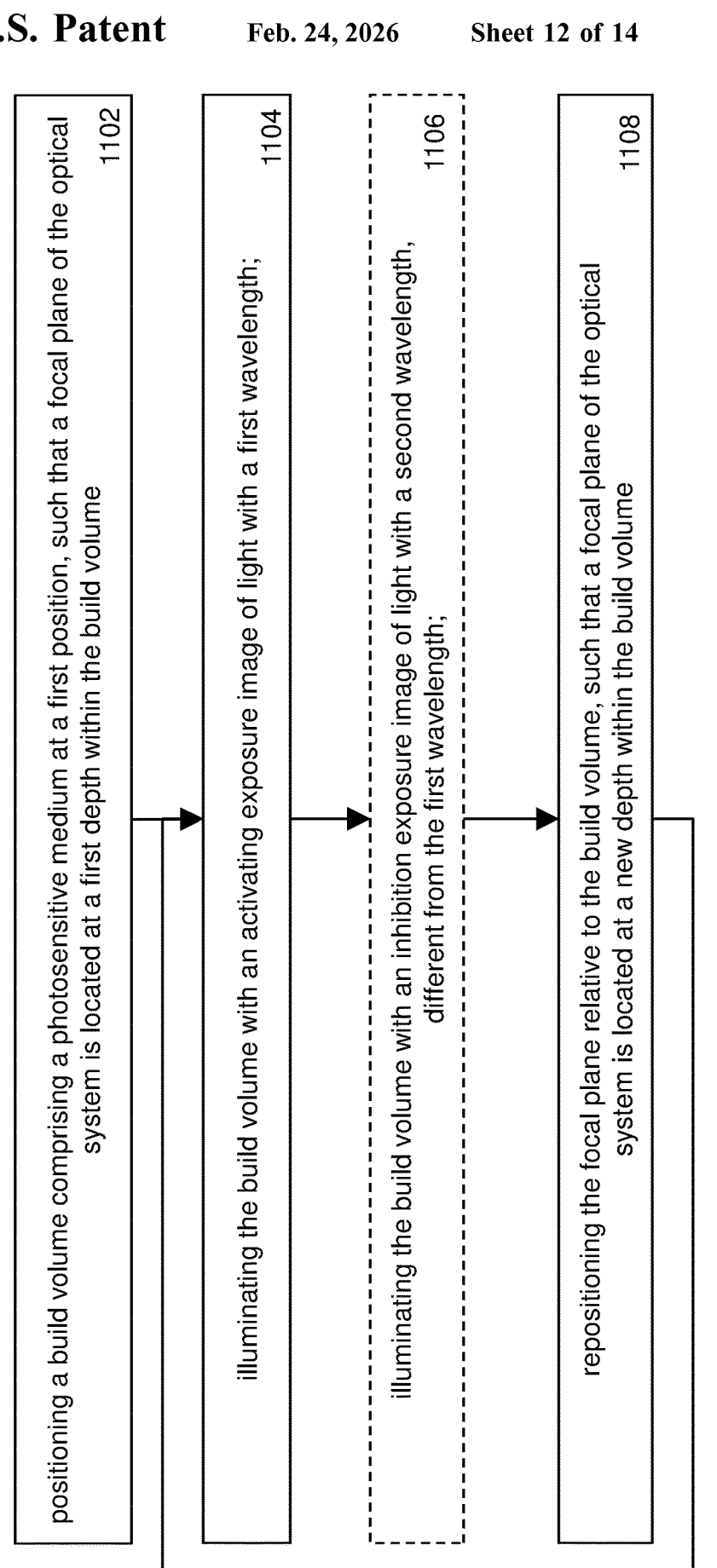

positioning a build volume comprising a photosensitive medium at a first position, such that a focal plane of the optical system is located at a first depth within the build volume
1102 illuminating the build volume with an activating exposure image of light with a first wavelength;
1104 illuminating the build volume with an inhibition exposure image of light with a second wavelength, different from the first wavelength;
1106 repositioning the focal plane relative to the build volume, such that a focal plane of the optical system is located at a new depth within the build volume
1108

FIG. 11

VOLUMETRIC MICROLITHOGRAPHY

FIELD OF THE INVENTION

The invention relates to volumetric microlithography and in particular, though not exclusively, to methods and systems for volumetric microlithography and to computer program products using such methods.

BACKGROUND OF THE INVENTION

In conventional photolithography techniques, parts of a planar-shaped photosensitive layer are exposed to radiation of a certain wavelength using an optical mask to form a photopolymerized 2D structure in the layer. These techniques allow high speed realization of a 2D structure, wherein the resolution is limited by the diffraction limit. High-resolution techniques such as Resolution Augmentation through Photoinduced Deactivation (RAPID), and PhotoInhibited Super Resolution (PInSR), may be used to push the resolution to sub-diffraction limits. These high-resolution maskless techniques include locally exposing a photosensitive layer that includes a photo-inhibitor with two laser beams of different wavelengths. One laser beam activates photopolymerization while the other laser beam activates the inhibitor which suppresses the photopolymerization. This way undesired polymerization outside the exposure area can be suppressed. Although high resolution 2D structures can be achieved, direct exposure using a laser beam is inherently slow. Moreover, shallow 3D structures may be realized with these 2D photolithography techniques by sequentially forming layers on top of each other. Such process is cumbersome, requiring careful alignment of the layers, which may affect the resolution.

Currently, maskless 3D photolithography techniques such as stereolithography (SLA) and multiphoton photolithography are developed that allow direct realization of 3D structures in a photosensitive medium. These techniques use a focused laser beam to initiate a local polymerization process in a volume of the medium, typically referred to as the build volume. These 3D photolithography techniques have many potential applications in fields like MEMS systems such as micro-fluidic devices, micro-optics and other three-dimensional micro-scale systems and IC technology, however current techniques still have drawbacks in terms of resolution and speed. In particular, the resolution is affected by polymerization outside of the desired zone, due to absorbed radiation and due to diffusion and propagation of chaingrowth.

U.S. Pat. No. 4,575,330A describes an SLA lithography system comprising a planar platform positioned in a container comprising a liquid polymerizable medium, which has a high absorptivity at a certain wavelength, typically UV. The platform is positioned at a height just below the surface of the medium so that a thin surface layer of the photopolymerizable medium is formed on the platform. A UV laser beam is controlled to locally expose part of the thin surface layer so that a structured polymerized layer is formed on the platform. After formation of the layer, the height of the platform is lowered so that again a thin surface layer of the photopolymerizable medium is formed over the polymerized layer. This way, layer-by-layer, a 3D structure can be fabricated. The layer-by-layer fabrication however significantly limits the speed of fabrication of the 3D structure. The technique also suffers from other unwanted effects, such as surface roughness and mechanical anisotropy. The need of a mechanically controllable and highly stable platform for forming the thin-film surface layer further complicates the process.

Similarly, US20050254035A describes a multiphoton lithography system (also known as direct laser lithography system) which uses a multi-photon absorption process in a specially designed photosensitive medium, which has a high absorption in the near infrared (NIR) region of the spectrum. A photopolymerization reaction is initiated only upon interaction with multiple photons absorbed by a photoinitiator molecule in a short span of time. This technique allows photopolymerization at any location within a build volume of the photosensitive medium. This way, 3D nano- and microstrucutres can be fabricated. This technique requires accurate control of laser sources generating high-intensity focused pulses for exposure of a location in the medium. Although structures with small detail can be realized, this technique is slow and limited to very small 3D micro- and nanostructures.

Hence, from the above it follows that the known maskless 3D photolithography techniques either lack speed, lack resolution and/or are not scalable for high-volume production. Therefore, there is a need in the art for improved methods and systems that allow fast realization of high-resolution 3D structures, preferably in a planar-shaped photosensitive medium. In particular, there is a need in the art for high-resolution, preferably micron or sub-micron resolution, photolithography techniques that allow fast realization of 3D structures in an, optionally planar-shaped, photosensitive medium in a scalable manner.

SUMMARY OF THE INVENTION

It is an objective of the invention to reduce or eliminate at least one of the drawbacks known in the prior art. In particular, it is an objective of embodiments in this disclosure to provide a method for rapid three-dimensional fabrication of micro-scale devices. The embodiments in this disclosure allow for an increased complexity of printable structures, compared to the complexity achievable in photolithography and dramatically improves the speed of fabrication compared to multiphoton lithography. In particular, the methods and systems of the embodiments described in this application allow fast formation of a high-resolution arbitrarily shaped three-dimensional structure, by means of a (digital) projection system, preferably a maskless projection system, which is configured for exposing a photosensitive medium to a sequence of exposure images comprising light of one or more wavelengths focused at a range of depths in the photosensitive medium. Thus, the exposure system defines a range of focal planes corresponding to the range of depths. In order to reach each focal plane in the range of depths, the light may propagate through at least part of the photosensitive medium. Preferably, the system comprises optical elements with a dynamically adjustable focal length, allowing to rapidly move the focal plane through the photosensitive medium. Imaging systems developed for confocal microscopy may, in fact, be used with some alterations to facilitate such fabrication methods. Additionally, techniques that allow active termination or inhibition of the polymerization reaction provide a method suitable for increasing the definition of the novel micro-fabrication technique. The system may include a computer for performing such methods.

In an aspect, the invention may relate to a method of volumetric microlithography for forming a 3D target structure, such as a polymer 3D target structure, in a photosensitive medium. The method may comprise receiving a data representation of a 3D target structure and determining a plurality of planes in a volume of a photosensitive medium or in a build volume, each plane of the plurality of planes associated with a respective depth of a plurality of depths in the build volume, the plurality of depths being defined along an optical axis of an exposure system. A plane may correspond to a possible position of a focal plane of the exposure system. Preferably, the depths in the plurality of depths are mutually different. The photosensitive medium may include an activation compound for initiating a chemical reaction in the photosensitive medium, the activation compound being activatable by light of a first wavelength. In an embodiment, the photosensitive medium may further include an inhibition compound for inhibiting the chemical reaction in the photosensitive medium, the inhibition compound being activatable by light of a second wavelength, different from the first wavelength. The method may also comprise computing, based on a shape of the 3D target structure and, preferably, properties of the photosensitive medium and/or specifications of the exposure system, a sequence of exposure images, where each exposure image of the sequence of exposure images is associated with a plane of the plurality of planes in the build volume. Each exposure image may be associated with light of the first wavelength and/or light of the second wavelength. In an embodiment, the light may be intensity modulated light. The method may further comprise, based on at least part of the plurality of planes, controlling the exposure system to position a focal plane of the exposure system at the depth in the build volume associated with the respective plane and to illuminate the build volume with the exposure image associated with the respective plane.

The properties of the photosensitive medium may comprise optical properties and chemical properties. The optical properties may include one or more of: absorption, refraction or scattering of light and, optionally, reactivity of the medium to light. The chemical properties may include a light-intensity dependent chemical reaction rate. The computation may also be based on optical specifications of the exposure system, typically expressed as a point spread function, optical transfer function, or impulse response, determining a geometry of light propagation inside the build volume. The optical specifications of the exposure system may include one or more of: depth of focus, spatial resolution and (source) light intensity.

As the techniques and equipment used for volumetric microlithography may be similar to those used for confocal microscopy, volumetric microlithography may also be referred to as confocal lithography.

In an embodiment, each of the plurality of planes in the build volume may be oriented perpendicular or substantial perpendicular to the optical axis of the exposure system.

In an embodiment, the 3D target structure may be related to an essentially planar-shaped 3D structure, i.e., an object that is substantially smaller in one dimension, typically the dimension in the direction of the optical axis of the exposure system (e.g. the z-axis), than in the other two dimensions, typically the lateral dimensions (i.e. the dimensions in a plane perpendicular to the optical axis, e.g. the x-y plane). Such 3D structures may be used in many applications, including e.g. micro-electromechanical systems (MEMS), microfluidic systems, batteries and photovoltaics. The 3D target structure may be a positive or negative image of a final object. For example, the final object can be the structure itself, or may be formed by filling empty spaces created by the 3D target structure by a different material, the 3D target structure essentially functioning as a mould. Transferring the structure from the 3D target structure to the final object may be achieved using various known techniques, such as physical or chemical vapour deposition, sputtering, moulding, or electro-plating.

The exposure system may define a depth of focus. Preferably, the depth of focus is small compared to a thickness of the build volume. The build volume may have a thickness in a direction parallel to the optical axis of the exposure system, and a lateral extent in directions perpendicular to the optical axis.

An exposure image in the sequence of exposure images may depend on both the 3D target structure and on other exposure images in the sequence of exposure images, usually the entire sequence of exposure images.

An exposure image of the first wavelength may be an activation exposure image and an exposure image of the second wavelength may be an inhibition exposure image. Therefore, illuminating the build volume with a sequence of exposure images may comprise illuminating the build volume with an activation exposure image and/or an inhibition exposure image associated with the respective plane. Illumination with an exposure image of the first wavelength associated with a depth and illumination with an exposure image of the second wavelength associated with the same depth may be performed simultaneously using suitable optics and/or a suitable image formation module in the exposure system, or may be performed separately.

In an embodiment, the photosensitive medium is substantially transparent for light of the first and second wavelengths. In practice, this may mean that light of the first and second wavelengths may reach a layer of the build volume furthest away from the optics with sufficient intensity to initiate, respectively inhibit, the chemical reaction. Consequently, the entire build volume may be illuminated nearly instantaneously, or at least in a highly parallel manner. Therefore, the method is much faster than methods where a 3D structure is created layer by layer, as in conventional 3D printing or stereolithography.

It is a further advantage of this method that super-resolution effects may be obtained, thus creating an object with a resolution higher than the resolution of the exposure system. The resolution of the exposure system may be limited by the system's diffraction limit or by other limits. Such super-resolution effects are known from e.g. the field of PhotoInhibited Super Resolution lithography or super-resolution (confocal) microscopy methods. These effects may be obtained by the interaction of light of the first wavelength and light of the second wavelength. If the limited resolution of the (optical) exposure system, e.g. its impulse response or point spread function, is accounted for in the mathematical model underlying the computation of the sequence of exposure images, these super-resolution effects may be obtained without additional effort.

Thus, the plane of focus of the exposure system may be moved through the photosensitive medium in the build volume, either optically by changing the properties of the exposure system, or by moving the entire build volume relative to the optical system. This way, an entire 3D structure may be created without having to wait for each layer to be cured before the next layer is created, as is done in conventional stereolithography systems. Although being focussed on a focal plane, the light of an exposure image illuminates the entire build volume. Consequently, the determination of an exposure image for a certain plane in the build volume depends not only on the shape of the object to be built at the corresponding depth, but also on the impulse response of the optical system, the shape of the object in other planes and the exposure images computed for (at least) adjacent planes.

In this application, lithography may refer to any method to create a two-dimensional or three-dimensional structure by illuminating a photosensitive medium such as a photo-polymer or a photoresist with one or more exposure images or light patterns. Optionally, the process may comprise a pattern or structure transfer step, such as developing of a structure, physical vapour deposition, moulding, or etching.

In this application, "light" may refer to electromagnetic radiation of any wavelength, in particular electromagnetic radiation in the visible spectrum; the near, medium, or far infrared spectrum; and the near, medium, or far ultraviolet spectrum.

In an embodiment, the photosensitive medium comprises a photoresist, preferably a high-contrast photoresist. The photoresist may be a photopolymeric photoresist, a photo-decomposing photoresist, a photo-crosslinking photoresist, or any other type of suitable photoresist. The photosensitive medium may be a solid medium, a gel-like medium, or a liquid medium. For example, the photoresist may be a photo-crosslinking photoresist controlled by two wave-lengths, where the first wavelength may stimulate creation of bonds and the second wavelength may slow the creation down or even break previously created bonds. The photo-resist can also be a photo-decomposing photoresist, where the first wavelength may remove chemical bonds and the second wavelength may slow down the removal of bonds or even stimulate reforming of bonds.

In an embodiment, the photosensitive medium is a photo-topolymerizable medium. The photopolymerizable medium may comprise a photo-initiator that is activatable at the first wavelength. The photopolymerizable medium may comprise a photo-inhibitor that is activatable at the second wavelength. The photopolymerizable medium may comprise species reacting to different wavelengths of illumina-tion. A species may be included that concurrently initiates and inhibits or terminates the chemical reaction upon being illuminated by two or more different wavelengths of radia-tion. Photopolymerizable media may include various types of chemical systems which may be based on e.g. free radical polymerization, cationic polymerization, anionic polymer-ization or acid catalysed polymerization or any other suit-able type of reaction. A photopolymerizable medium may contain a photo-initiator component that, when exposed to radiation of a certain intensity for a certain period, may generate chemical species that participate in the reaction of polymerization. The reaction rate may depend on the con-centration of the photo-initiator, its quantum yield, and the amount of illumination energy absorbed by it, among other parameters. In order to improve photo-initiator sensitivity to illumination of a particular wavelength, photosensitizers may be used.

In an embodiment, moving the focal plane relative to the build volume may comprise dynamically adapting a focal length. To this end, the exposure system may include an objective with a dynamically adjustable focal length. This allows for rapidly focusing exposure images or illumination images, generated by e.g. a spatial light modulator, in a range of focal planes located at different depths within the build volume. In an embodiment, this may be realized using, for instance, Fast Piezo Focus Systems (PIFOC) or liquid dynamic focus lenses. These may be elements that are used for confocal microscopy.

In an embodiment, moving the focal plane relative to the build volume may comprise moving a holder holding the build volume relative to the exposure system, preferably in a direction parallel to an optical axis of the exposure system. Such a system may have relatively simple optics. The system may comprise a motorized stage with preferably sub-micron positioning accuracy, e.g. using a stepper motor.

In an embodiment, the confocal or volumetric micro-lithography method may also be used in systems where inhibition of the photopolymerization reaction is not con-trolled via illumination with light of a second wavelength, but is associated with an agent that inhibits photopolymer-ization at an approximately constant rate in every part of the volume. Such a 'single-wavelength' method can also be advantageously combined with a so-called high-contrast photoresist. A high-contrast photoresist reacts to a cumula-tive light intensity in a more abrupt way allowing to achieve a sharper boundary of e.g. a solid to liquid interface, or a polymerized to non-polymerized interface.

In an embodiment, the exposure system may comprise an image formation module, which may comprise a light source and a spatial light modulator, or which may comprise a controllable display. In an embodiment, controlling the exposure system to illuminate the build volume with the exposure image associated with the respective plane may comprise controlling a first and/or second light source to generate light of the first and/or second wavelength and controlling a spatial light modulator to modulate the light according to the exposure image. Controlling the exposure system to illuminate the build volume with the exposure image associated with the respective plane may also com-prise controlling a controllable display to generate light of the first and/or second wavelength in a pattern according to the exposure image. A pattern may comprise both (two-dimensional) spatial information and intensity information.

In an embodiment, the method may further comprise transferring the structure, preferably using chemical or physical vapour deposition or sputtering. Optionally, the method may further comprise a developing the structure. This way, structures of different materials, such as metals or semiconductors, may be formed.

In an embodiment, the method may further comprise dividing the build volume in a plurality of blocks, each block in the plurality of blocks having a lateral extent not larger than the field of view of the exposure system and moving the build volume relative to the exposure system along one or more directions of the lateral extent in accordance to dimen-sions of a block. In such an embodiment, computing a sequence of exposure images may comprise computing a sequence of exposure images for each block of the plurality of blocks.

By dividing the build volume into blocks based on the field of view of the exposure system, objects with a lateral extent larger than the field of view may be produced. The 3D target structure may then be formed by illuminating the photosensitive medium block by block. In an embodiment, computation of a sequence of exposure images for a block may depend on a sequence of exposure images for an adjacent block.

In an embodiment, the 3D target structure may comprise a plurality of identical point-like, line-like or sheet-like structures. In that case, computing a sequence of exposure images may comprise determining a kernel for initiating the chemical reaction according to the point-like, line-like or sheet-like structure, the kernel preferably comprising a pat-tern of one or more pixels encoding light of the first wavelength and pixels encoding light of the second wave-length. The computing may further comprise and repeating the kernel within one or more of the exposure images. In an embodiment, the pixels encoding light of the first wavelength may be surrounded by pixels encoding light of the second wavelength, in order to localize the chemical reaction, e.g. polymerization, to the point-like, line-like, or sheet-like structures.

Thus, relatively simple structure may be created without explicitly solving a computational model for the entire build volume or a substantial part of the build volume. The kernel may be pre-computed based on e.g. an impulse response or point-spread function of the exposure system. The kernel is typically much smaller, i.e. comprises much fewer pixels, than an exposure image. The kernel may be based two-dimensional or three-dimensional, where the sequence of exposure images defines a third dimension, based on the plurality of depth with which the exposure images are associated, and on which the exposure images are to be focussed. A computation based on a kernel may be particularly efficient for the creation of sparse 3D target structures, having little or no mutual influence between various parts of the build volume.

In an embodiment, computation of the sequence, preferably the optimal sequence, of exposure images may be based on determination of a target chemical reaction rate, e.g. a polymerization rate $P_0(x, y, z)$ in each point of the build volume. The computation may further comprise determination of a depth-dependent intensity of the sequence of exposure images $S_0(x, y, z)$ based on a mathematical model of the polymerization rate P and a model of radiation propagation $\mathcal{R}$. The sequence of exposure images $S_0(x, y, z)$ may describe a sequence of images that is generated by an image formation module, e.g. a spatial light modulator or controllable display, where each exposure image is defined on an xy-plane for a focal plane at depth z. Although an exposure image is focused on a focal plane, the exposure image may illuminate the entire depth or thickness of the build volume. Therefore, for computation of the cumulative light intensity in each part of the build volume, the entire sequence of exposure image must be considered.

As the exposure image associated with each (focal) plane may influence the (cumulative) light intensity in other planes, it is advantageous to compute the complete sequence of exposure images in a single procedure, rather than field by field. In particular, the total or cumulative intensity may be considered a superposition of the effects of all exposure images in the sequence of exposure images. Due to the spatial effects of the focusing cone, and the optical properties of the photosensitive medium, this effect may be different for each plane in the plurality of planes.

The polymerization rate model $\mathcal{P}[L]$ may predict the polymerization rate P(x, y, z) achieved in each point inside the build volume given the cumulative illumination intensity L(x, y, z). The illumination intensity L(x, y, z) may be predicted in each point inside the build volume by a radiation propagation model $\mathcal{R}[S]$ given the sequence of exposure images S (x, y, z) generated by the image formation module. In this context, the illumination intensity is a cumulative intensity over all exposure images of the sequence of exposure images.

In an embodiment, computing a sequence of exposure images $S_0$ may comprise computing a sequence of exposure images based on a model $\mathcal{M}$ for predicting a chemical reaction rate due to a sequence of exposure images projected into a photosensitive medium, preferably an attenuating photosensitive medium. Preferably, the computing comprises solving $S_0 = \mathcal{M}^{-1}[P_0(x, y, z)]$, wherein $\mathcal{M}^{-1}$ is an

8 inverse of $\mathcal{M}$, and wherein $P_0(x, y, z)$ is a target chemical reaction rate at a position in the build volume with spatial coordinates $\{x, y, z\}$.

In an embodiment, $\mathcal{M}$ is a combination of a linear propagation model R and a linear polymerization model $\mathcal{P}$, and solving $S_0 = \mathcal{M}^{-1}[P_0(x, y, z)]$ comprises computing an explicit inverse of $\mathcal{M}$. An explicit inverse may have a high precision, but may have high computational demands, and may not always be mathematically or computationally possible.

In an embodiment, solving $S_0 = \mathcal{M}[P_0(x, y, z)]$ may comprise iteratively computing an approximate solution $S_0$, the computing including minimizing a difference between the target chemical reaction rate $P_0$ and a chemical reaction rate $P(S_0)$ achieved due to illuminating the build volume with the sequence of exposure images $S_0$. Iterative solutions can be flexible an relatively easy to implement, but may require balancing computation times against precision.

In an embodiment, solving $S_0 = \mathcal{M}^{-1}[P_0(x, y, z)]$ may comprise determining an approximation of $\mathcal{M}^{-1}$, preferably based on convolution. Such an approximate inverse may be relatively fast, with an acceptable accuracy.

The polymerization rate integrated over the time of exposure gives the monomer conversion which is defined as the ratio between the number of formed covalent bonds and the maximum possible number of such bonds in a volume element. The monomer conversion can be directly translated into a gel fraction as described in the below-mentioned article by Torres-Knoop and the second article by Kryven. This gel fraction characterizes the so-called hardness of the cured resin in each volume element. An illuminated volume element cures as soon as the monomer conversion reaches a certain critical value.

In an embodiment, the polymerization rate model P may be implemented using reactive molecular dynamics. Such model is, for example, described in the article by Torres-Knoop, A, et al. Soft matter 14.17 (2018): 3404-3414. https://doLorq/10.1039/c8sm00451i, which is hereby incorporated by reference into this application. In another embodiment, the polymerization rate model $\mathcal{P}$ may be a based on a dynamic random graph technique, which is an analytical approximation of the reactive molecular dynamics. This technique is described in two articles by Kryven, I. Phys. Rev. E 94.1 (2016): 012315 and Kryven, I. J Math Chem (2018) 56: 140, which are hereby incorporated by reference into this application.

In an embodiment, the polymerization rate model $\mathcal{P}$ may be implemented via a simple linear approximation of the type: $\mathcal{P}[L] = \Sigma \alpha_i L_{\lambda,i} - \alpha_0$, e.g. a sum of the $L_{\lambda,i}$ the monochromatic components of the illumination intensity with some proportionality coefficients $\alpha_i$. When some form of a photoinhibitor is included in the medium, a dual-wavelength polymerization model can often be implemented: $\mathcal{P}[L] = \alpha L_{\lambda,1} - \beta L_{\lambda,2} - \gamma$, where $L_{\lambda,1}$ and $L_{\lambda,2}$ are the illumination intensities responsible for increasing or decreasing the rate of polymerization. A second wavelength absorbed by the photoinhibitor can be introduced to compensate for the photopolymerization induced by the radiation that is absorbed outside of the focal plane, In this case, 'positive' exposure and 'positive' image relate to exposure associated with initiating the photopolymerization reaction in a photopolymerizable medium or an analogous process in a photoresist, while 'negative' exposure and 'negative' image relate to exposure associated with inhibiting photopolymerization or an analogous process.

In an embodiment, the radiation propagation model $\mathcal{R}$, predicting the cumulative illumination intensity L(x, y, z) in the build volume, corresponding to the sequence of exposure images S(x, y, z), may be based on the geometrical optics approximation (i.e. ray tracing) or wave optics (for instance, Radiative Transport Equations). Both models $\mathcal{R}$ and $\mathcal{P}$ can be combined to find the relation between the sequence of exposure images and the polymerization rate: P(x, y, z)=$\mathcal{P}$ [ $\mathcal{R}$ [S(x, y, z)]] or P(x, y, z)=$\mathcal{M}$ [S(x, y, z)], where $\mathcal{M}$ is the combined model. In order to precompute the optimal sequence of exposure images $S_0$(x, y, z) needed to achieve the target polymerization rate $P_0$(x, y, z), the inverse problem may be solved for the combined model. The solution can be calculated using the methods of linear algebra in explicit form (for instance, as a matrix inverse) or iteratively, using an optimization algorithm (for instance, the gradient descent method).

In an embodiment, the propagation model $\mathcal{R}$ may include optical aberrations, scattering effects and diffraction effects, e.g. the Airy disc effect. When an inverse is calculated using such a model, a super-resolution effect may be achieved.

In an embodiment, the method may further comprise detecting light of an exposure image, the light having interacted with the photosensitive medium, preferably the light being transmitted through the photosensitive medium or the light being reflected or scattered by the medium or the light being reemitted by the photosensitive medium; and using the detected light to determine optical properties of the photosensitive medium. The optical properties may be indicative of local physical or chemical properties.

The optical properties may be related to e.g. a concentration of a photosensitive agent in the photosensitive medium or a change therein, or the presence of external objects in the build volume. The determined optical properties may be used for e.g. quality control, progress control, et cetera, or for aligning the sequence of exposure images when the 3D target structure is formed relative to a pre-existing structure. This may be especially relevant in the case of multi-direction illumination. This may e.g. be applied in semiconductor packaging, or to create a multi-layer or multi-material object, where the respective layers or materials are created in separate steps.

In an embodiment, the method may further comprise updating the computed sequence of exposure images based on a difference between the determined optical properties and predicted optical properties. This may further improve the quality of the created structure.

In an embodiment, a monitoring system may be implemented in the exposure system, wherein the light transmitted through the build volume can be measured during the illumination (as in transmission microscopy) and used to compute an updated medium absorptivity. Alternatively, fluorescence light induced during the illumination may be measured similar the method used in confocal microscopy in order to compute an updated concentration of the photosensitive compound in the medium. In general, such measurements can be used either during the initialization of the fabrication process, in real-time during the fabrication process to optimize the sequence of exposure images, or at the end, for quality control.

In an embodiment, an exposure image may comprise pixels or may be described by pixels, a pixel having a pixel value encoding a light intensity of the first wavelength and/or a light intensity of light of the second wavelength. An exposure image may be associated with the plane on which the exposure image is to be focussed.

In an embodiment, the build volume and/or the plurality of planes may be described by a voxel representation comprising voxels (volume elements associated with points in 3D space), a voxel having a voxel value, the voxel value encoding a target state of the photosensitive medium based on the shape of the 3D target structure. A voxel may be associated with a plane of the plurality of planes. In an embodiment, each plane may comprise a plurality of voxels, preferably a height of a voxel being equal to a distance between planes in the plurality of planes. Optionally, a voxel in a plane may correspond to or be associated with one or more pixels in the exposure image associated with the respective plane.

In a different embodiment, the voxel representation may be determined in a different coordinate system than the plurality of planes. For example, a first data representation may be used to describe the received 3D target structure, a second data representation, possibly with a different resolution, may be used to describe a target chemical reaction rate in the build volume, and a third data representation, possibly with yet another resolution, may be used to model light propagation through the build volume.

In an embodiment, computing a sequence of exposure images may further comprise providing a first model for computing the trajectory of light propagation focussed at a voxel of the build volume and/or originating from a pixel of an exposure image.

In an embodiment, computing a sequence of exposure images may further comprise providing a second model for predicting a change of a state and/or a chemical reaction rate in a voxel of the build volume induced by cumulative exposure of the voxel to the sequence of exposure images.

In an embodiment, computing a sequence of exposure images may further comprise, for one or more pixels in at least one exposure image of the sequence of exposure images, computing a light intensity of light of the first wavelength and/or of light of the second wavelength based on an exact or approximated solution of an inverse problem for the first model and/or the second model.

In an embodiment, computing a sequence of exposure images may further comprise, for a first voxel, computing a light intensity of light of the first wavelength and/or of light of the second wavelength for an exposure image associated with the plane associated with the first voxel, based on a voxel value of the first voxel and the light intensity computed for one or more second voxels adjacent to the first voxel, preferably the computing comprising determining a solution of an inverse problem.

The solution to the inverse problem may be an exact or an approximate solution. The inverse problem may be based on a first model for computing a cumulative light intensity at each voxel in the build volume. The first model may comprise computing a trajectory of light propagation (light path) for illumination by an exposure image focused at a plane at a predetermined depth. A trajectory may be computed for each pixel of each exposure image, the computation taking into account the depth of the focal plane.

Additionally or alternatively, the inverse model may be based on a second model for predicting the change of the state in each voxel of the build volume induced by the cumulative exposure of the voxel to light, e.g. predicting a rate of the chemical reaction or a threshold value for activating and/or inhibiting the chemical reaction.

The step of computing a sequence of exposure images may comprise, for a pixel in at least one exposure image of the sequence of exposure images, computing a light intensity of light of the first wavelength and/or of light of the second wavelength based on the exact or approximated solution of the inverse problem for the first and second models.

In an embodiment, computing a sequence of exposure images may further comprise, for a first pixel focussed on a first voxel, computing a pixel value based on a voxel value of the first voxel and at least one of: a voxel value of one or more second voxels different from the first voxel, or a pixel value of one or more second pixels different from the first pixel; preferably the computing comprising determining an inverse of a model determining a chemical reaction rate or a cumulative light intensity in the build volume.

In an embodiment, computing a sequence of exposure images may further comprise computing a plurality of exposure images for each plane of the plurality of planes, each exposure image being associated with a different objective of a plurality of objectives or with a different position of an objective configured to move between a plurality of positions relative to the build volume, the one or more objectives being configured to illuminate the build volume, preferably the plurality of objectives, respectively the plurality of positions, being configured to obtain an effective numerical aperture larger than the numerical aperture of each of the one or more objectives. Using multiple objectives and/or an objective configured to move relative to the build volume, a higher effective numerical aperture may be obtained, increasing the resolution in at least one dimension.

In an aspect, the invention relates to a computation module for volumetric microlithography system, comprising a computer readable storage medium having at least part of a program embodied therewith, and a processor, preferably a microprocessor coupled to the computer readable storage medium, wherein responsive to executing the computer readable storage code, the processor is configured to perform executable operations comprising receiving a data representation of a 3D structure. The executable operations may further comprise determining a plurality of planes in a volume of a photosensitive medium in a build volume, where each of the plurality of planes is associated with a depth in the build volume along an optical axis of an exposure system. Preferably, the depths in the plurality of depths are mutually different. Each plane may correspond to a possible position of a focal plane of the exposure system. The photosensitive medium may include an activation compound for initiating a chemical reaction in the photosensitive medium, where the activation compound is activatable by light of a first wavelength. Preferably, the photosensitive medium also includes an inhibition compound for inhibiting the chemical reaction in the photosensitive medium. Preferably, the inhibition compound is activatable by light of a second wavelength, different from the first wavelength. The executable operations may further comprise computing, based on a shape of the structure and, preferably, properties of the photosensitive medium and/or specifications of the exposure system, a sequence of exposure images, where each exposure image of the sequence of exposure images is associated with a plane of the plurality of planes, and each exposure image comprises light of the first wavelength and/or light of the second wavelength. The executable operations may further comprise storing or exporting information defining the computed sequence of exposure images for use by an exposure system.

The computation system may further be configured to perform any of the computation steps mentioned above.

In an aspect, the invention relates to an exposure system for volumetric microlithography. The exposure system may comprise a holder for holding a build volume. The build volume may comprise a photosensitive medium including an activation compound for initiating a chemical reaction in the photosensitive medium, where the activation compound is activatable by light of a first wavelength. Preferably, the photosensitive medium also includes an inhibition compound for inhibiting the chemical reaction in the photosensitive medium, where the inhibition compound is activatable by light of a second wavelength, different from the first wavelength. The exposure system may further comprise optics configured to create a focal plane with a depth of focus that is thin compared to a thickness of the build volume in a direction parallel to an optical axis of the optics. The exposure system may further comprise a first image formation module for generating an exposure image of the first wavelength in dependence of a position of the focal plane relative to the build volume. Preferably, the exposure system also comprises a second image formation module for generating an illumination of the second wavelength in dependence of the position of the focal plane relative to the build volume. The exposure system may further comprise a processor, configured for receiving information defining a sequence of exposure images of the first and/or second wavelength, where each exposure image of the sequence of exposure images is associated with a depth in the build volume along an optical axis of the optics. For each exposure image, the processor may control the optics and/or the holder to position the focal plane of the optics system at the depth in the build volume associated with the respective exposure image. The processor may further control the first and/or second image formation module to illuminate the build volume with the respective exposure image.

In an embodiment, the first image formation module may comprise a light source for generating light of the first wavelength, and a spatial light modulator, e.g. a digital micromirror device. In a different embodiment, the first image formation module may be a single device, e.g. comprising an OLED screen. In an embodiment, the second image formation module may comprise a light source for generating light of the second wavelength, and a spatial light modulator, e.g. a digital micromirror device. In a different embodiment, the second image formation module may be a single device, e.g. comprising an OLED screen. In an embodiment, the first image formation module and the second image formation module may be the same device, configured for generating light of both the first and second wavelengths.

In an embodiment, the exposure system may include light sources operating at a single wavelength or at multiple wavelengths. The light sources may be coupled with a spatial light modulator (SLM) for producing a rapid succession of precomputed exposure images. Alternatively, the light sources may include a laser scanning system. Other methods for achieving the same effect may similarly be used.

In an embodiment, the optics are adjustable optics configured to create a focal plane with a dynamically adjustable focal length. In an embodiment, the holder is configured to be movable in a direction parallel to the optical axis.

In an embodiment, the exposure system may comprise an additional image formation module for illuminating the build volume from a direction different form the direction of the first and/or second image formation module.

In an aspect, the invention relates to a module for an exposure system, comprising a processor, configured for receiving information defining a sequence of exposure images of the first and/or second wavelength, each exposure image of the sequence of exposure images being associated with a depth in the build volume along an optical axis of the optics, and for each exposure image controlling the optics and/or the holder to position the focal plane of the optics system at the depth in the build volume associated with the respective exposure image; and controlling the first and/or second image formation module to illuminate the build volume with the respective exposure image.

The module may be combined with an existing microscope, preferably a microscope configured for confocal microscopy, to obtain an exposure system according to an embodiment of the invention. The module may further comprise an actuator to operate dynamically adjustable optics of the microscope. The module may further comprise one or more image formation modules, e.g. a light source and a spatial light modulator and/or a dynamically controllable display.

The invention may also relate to a computer program or suite of computer programs comprising at least one software code portion or a computer program product storing at least one software code portion, the software code portion, when run on a computer system, being configured for executing one or more of the method steps described above.

The invention may also relate to a non-transitory computer-readable storage medium storing at least one software code portion, the software code portion, when executed or processed by a computer, is configured to perform one or more of the method steps as described above.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fibre, cable, RF, etc., or any suitable combination of the foregoing. Computer program code for carrying out operations for aspects of the present invention may be written in any combination of one or more programming languages, including an object-oriented programming language such as Java™, Python, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The invention will be further illustrated with reference to the attached drawings, which schematically will show embodiments according to the invention. It will be understood that the invention is not in any way restricted to these specific embodiments.

BRIEF DESCRIPTION OF THE DRAWINGS

FIG. 10 depicts a flow diagram describing a method of volumetric microlithography according to an embodiment of the invention;

FIG. 11 depicts a flow diagram describing a method illuminating a build volume according to an embodiment of the invention;

DETAILED DESCRIPTION

Figure 1A:
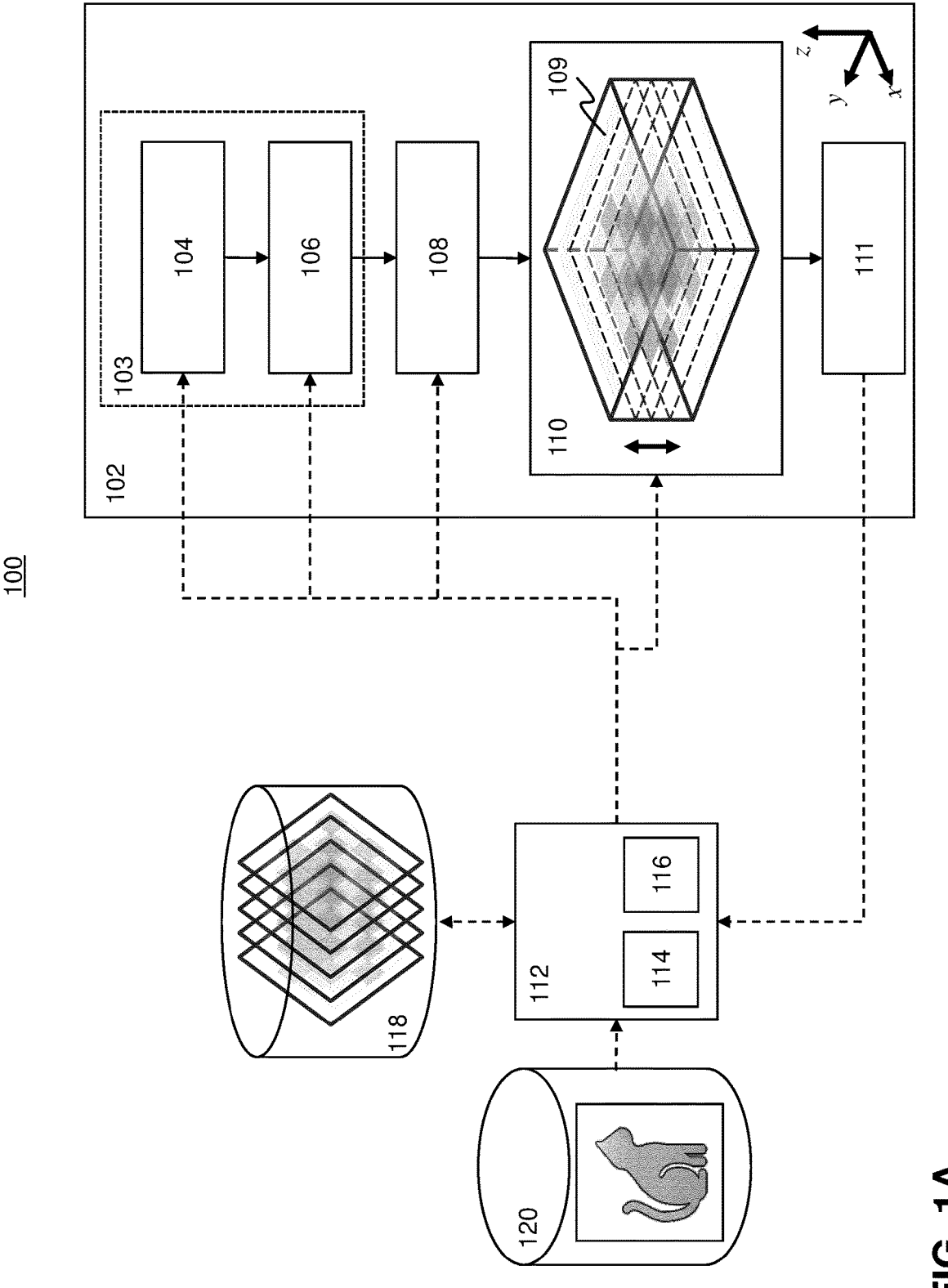
FIGS. 1A and 1B depict schematic representations of a volumetric microlithography system according to an embodiment of the invention.
Figure 1B:
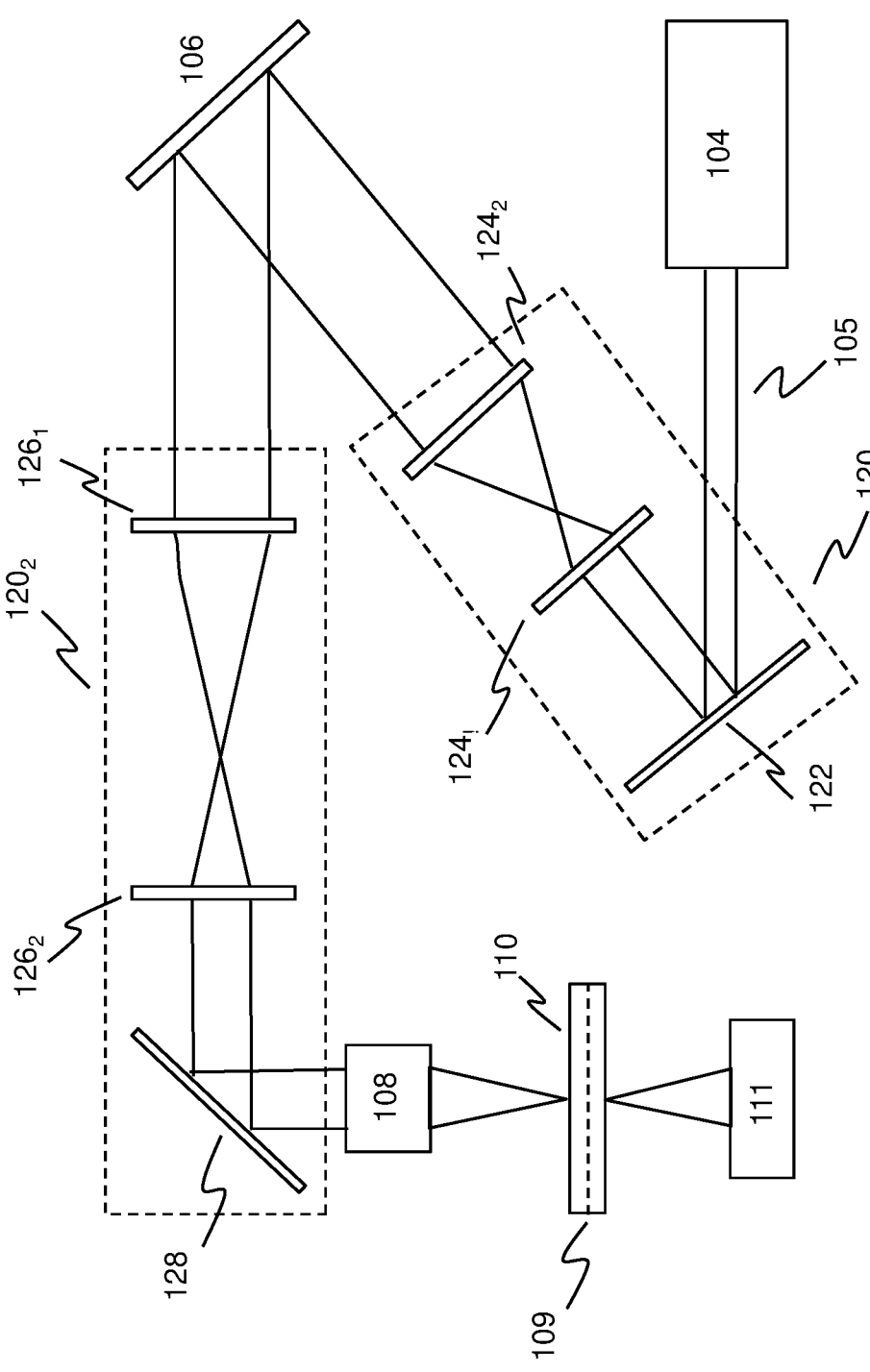

FIGS. 1A and 1B depict schematic representations of a 'confocal' or volumetric microlithography system according to an embodiment of the invention. The volumetric microlithography system 100 may comprise an exposure system 102 and a computer system 112 for controlling the exposure system. The exposure system may be implemented similar to a confocal imaging system or a structured light illumination system, for optical exposure of a volume of a, typically planar shaped, photosensitive medium 109. The volume of the photosensitive medium that is exposed may hereafter be referred to as the build volume. Further, the system may comprise a monitoring system 111, e.g. a video camera, for monitoring the exposure of the photosensitive medium The exposure system 102 may comprise an image formation module 103 and an optical system 108 for focusing light from the image formation module in the photosensitive medium. The image formation module may comprise a light source 104 and a computer-controllable spatial light modulator 106. FIG. 1B depicts an exemplary implementation of an exposure system, including a light source, e.g. a laser, that generates a light beam 105 of a predetermined wavelength. A first optical system $120_1$ comprising one or more mirrors 122 and lenses $124_{1-2}$ may be configured to relay the light beam onto a spatial light modulator. The spatial light modular may comprise computer-controllable pixel elements which can be used to modulate the light that falls onto such pixel element. For example, in FIG. 1B the SLM may be implemented as a digital micro-mirror device (DMD), wherein each pixel element is configured as a controllable micro-mirror. In other embodiment, the SLM may be implemented as a liquid crystal SLM, wherein each pixel element is configured as an optical element for controlling the intensity of the light.

Modulated light originating from the SLM may be directed via a further second optical system $120_2$ comprising one or more mirrors 128 and lenses $126_{1-2}$ towards a focusing element 108, e.g. an objective, that is configured to project the modulated light onto a focal plane which is positioned in the planar shaped photosensitive medium. The focusing element may have a focal length that is adjustable so that the position of the focal plane in the planar shaped photosensitive medium. The planar shaped photosensitive medium 109 may be oriented such that the optical axis of the exposure system is oriented perpendicular to the lateral plane of the planar shaped photosensitive medium. The planar shaped photosensitive medium may be implemented as a photoresist layer on a substrate, e.g. a transparent substrate. Alternatively, the planar shaped photosensitive medium 109 may be a liquid photo-polymerizable medium in a planar shaped container.

The exposure system may comprise a stage 110 which is movable perpendicular to the optical axis (i.e. in the plane of the planar shaped photosensitive medium, e.g. the x-y direction) and/or in the direction of the optical axis (e.g. the z-direction). The movable stage may be connected to a stepper motor to control the position of the stage with high accuracy. The adjustable focusing element and/or the movable stage may be controlled to position the focal plane at a range of predetermined depths in the build volume.

The computer system may comprise software and/or hardware modules configured to control the focal distance of the focusing element (the objective) to produce a sequence of focal planes in the build volume in the planar shaped photosensitive medium and to control the spatial light modulator so that at each focal plane the medium is exposed to a predetermined modulated light pattern. Full exposure of the build volume to the different exposure images as the different focal planes will result in a photopolymerized build volume that is structured according to a desired predetermined target 3D structure.

To that end, the computer system may comprise a processor 114 for executing one or more software programs and a memory 116 for holding a representation of a 3D target structure, i.e. the 3D structure that is formed by exposing the build volume according a sequence of modulated light patterns at different focal planes of the exposure system. A modulated light pattern generated by the SLM and projected by the exposure system onto a focal plane in the build system may hereafter be referred to as an exposure image. For example, in an embodiment, the processor may convert an input 3D model of a 3D target structure into a voxel representation (a 3D array of volume elements) of the target polymerization rate $P_0(x, y, z)$, i.e. the speed of polymerisation at voxel positions of the 3D target structure that is required to form the desired 3D target structure. The target polymerization rate can be defined in e.g. cartesian coordinates x, y, z or cylindrical coordinates r, $\phi$, z that describe the 3D space of the build volume 109. The target polymerization rate $P_0(x, y, z)$ may be equal to or may exceed some critical value $P_{crit}$ for every location inside the build volume that has to be cured. Further, it may be zero for every location that should stay uncured. The critical value $P_{crit}$ may depend on the reactivity of the photosensitive medium and the total exposure time.

In an embodiment, the processor of the computer may be configured to determine a sequence of exposure images 118 $S_0(x, y, z)$ for a given target polymerization rate $P_0(x, y, z)$. The software for determining these exposure images may be implemented as a computation module which may be configured to receive a representation of a 3D structure and determining a sequence of exposure images based on the representation of the 3D structure and properties of the photosensitive medium and of the exposure system 102.

An optimization algorithm may be used for determining the sequence of exposure images. The optimization may be based on solving an inverse problem for a propagation model $\mathcal{R}$, that provides a mathematical description of the propagation and attenuation of radiation in the build volume and a polymerization model $\mathcal{P}$ describing the polymerization rate initiated by the absorbed radiation. Propagation model $\mathcal{R}$ may be based on a geometrical optics approximation (i.e. ray-tracing) and/or wave optics (for instance, a wave optics described by a set of radiative transport equations), depending on the desired accuracy. In some embodiments, both models may be combined, and a solution may be obtained for the combined problem. If both models are linear, an exact solution may be calculated, e.g. by using some form of matrix inversion. Alternatively, an approximate solution can be obtained using iterative optimization methods, for instance when a non-linear polymerization model is used. An approximate solution may also be obtained by using an approximation. For example, in one embodiment, a convolutional approximation to the propagation model and/or the polymerization model may be used. More detailed examples for calculating the exposure images for a build volume are described hereunder with reference to FIGS. 8 and 9.

The computer may further comprise control module which is configured for controlling the exposure system 102 based on a sequence of exposure images. The process of controlling the exposure system may comprise controlling the image formation module 103, controlling optical elements 108 to adjust the focal length, and controlling stage or holder 110 to displace the build volume in a direction parallel and/or orthogonal to the optical axis of the optical elements.

The control module may receive a sequence of exposure images 118 $S_0(x, y, z)$ for different focal lengths as computed by the computation module or received a sequence of exposure images from an external source. The control module subsequently executes an exposure process wherein the build volume of a photosensitive medium is exposed to a sequence of intensity modulated images at different focal lengths. To that end, the control module controls the focusing element 108 to rapidly change the focal length such that the build volume is exposed to different exposure images at different focal planes in the build volume. The different focal lengths may be selected such that the whole build volume is exposed. This process is described in more detail with reference to FIG. 2.

Figures 2A, 2B:
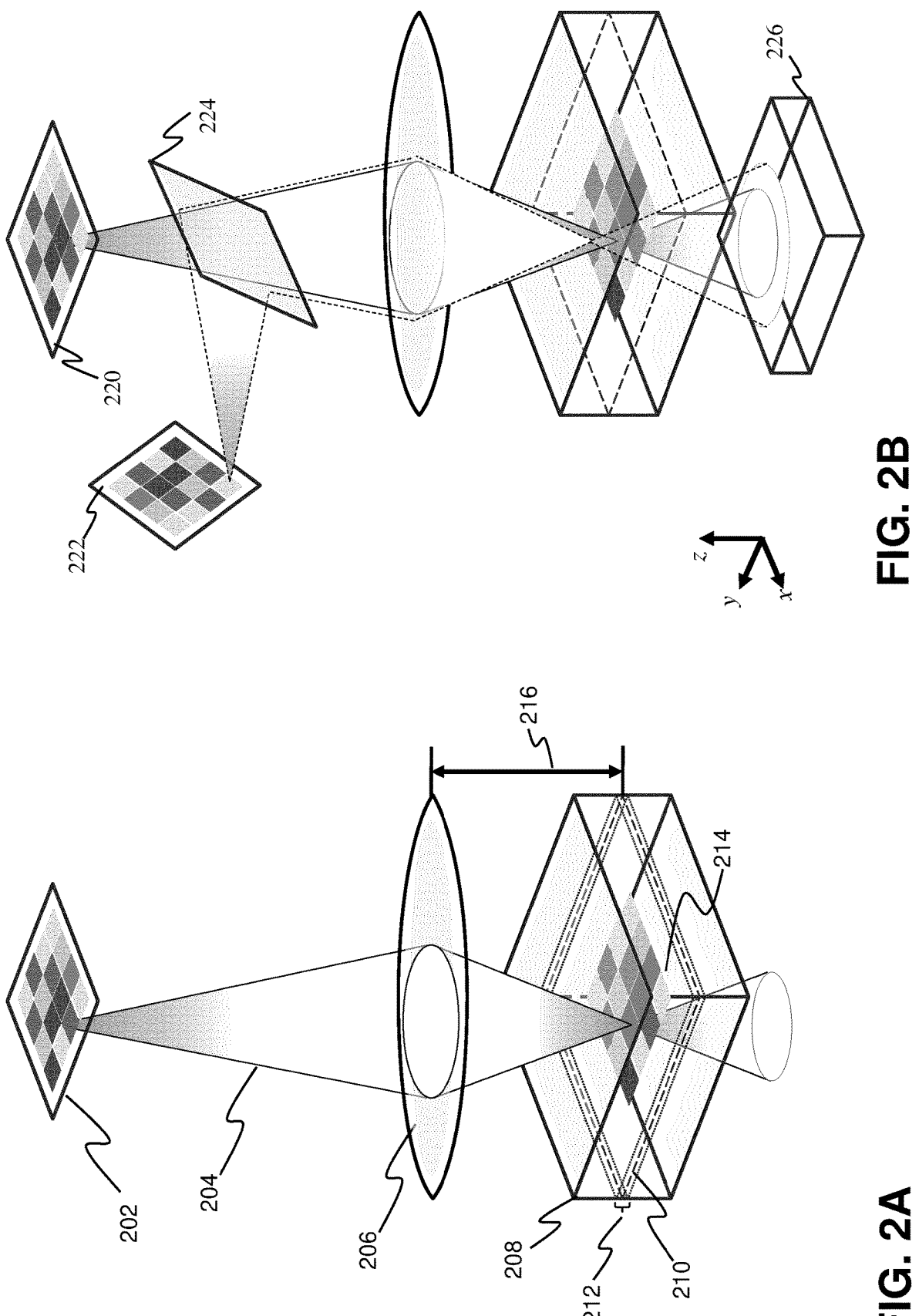
FIG. 2A-2B depict drawings of an exposure systems of a volumetric microlithography system, according to various embodiments of the invention.

FIGS. 2A and 2B depict schematics of exposure systems according various embodiments of the invention. In particular, FIG. 2A depicts an exposure system comprising an image formation module 202 comprising a spatial light modulator (SLM), a light source and an optical system for generating an intensity modulated radiation pattern, wherein every irradiating point (pixel) results in a light cone 204. The image may be created as a 2D plane image, or by e.g. rapidly 2D scanning of a point intensity. The light cone is focused by optical focussing element 206. In an embodiment, the optical focusing element may be implemented as an objective lens with a high angular aperture or high Numerical Aperture (NA). High angular aperture allows to achieve high cone angles and, hence, shorter depths of focus which is desirable for better depth resolution. For instance, a standard objective lens with NA=0.87 corresponds to the angular aperture of 60°. When using a state-of-the-art oil immersion lens system, a numerical aperture NA in the range between 1.0 and 1.4 may be achieved. Alternative configurations for achieving a high effective numerical aperture are discussed below with reference to FIG. 12. The optical element defines a focal plane 210 with a depth of focus 212 at a focal length 216 from an objective lens. As each pixel element of the SLM will create a light cone as depicted in FIG. 2A, an exposure image 214 may be projected at the focal plane in a build volume 208. Typically, the planar-shaped photosensitive, the z-direction is defined in the direction of the optical axis of the exposure system, which is normal to the plane of focus.

The exposure images may be formed by controlling an SLM 202 and the objective lens 206. The objective lens may be a system of optical elements configured to focus an exposure image 214 at axial position z inside the build volume 208. The objective lens may be configured to dynamically change the focus in the axial position using an actuator. Typical scanning speeds of a state of the art piezo-actuated may be 100 micron per second with close to 1 nm accuracy. This speed may be increased using liquid dynamic focus lenses. For instance, a commercially available a PIFOC ND72Z2LAQ system may perform axial scanning with steps of 3 micron in 20 microseconds, allowing to project 50 images per second in the range of 150 micron.

The radiant energy of each pixel of the image spreads in a light cone 204 according to the divergence properties of the light source and is condensed back to a small area in the focal plane 210 of the objective lens 206. This by itself allows to confine the polymerization reaction within a narrow depth of focus 212 within the build volume 208. Such confinement would allow to create layers of the 3D target structure by focusing a sequence of 2D exposure images at different depths. However, if large areas have to be cured simultaneously, the divergence effect will play a lesser role and the resolution will deteriorate.

Figure 4:
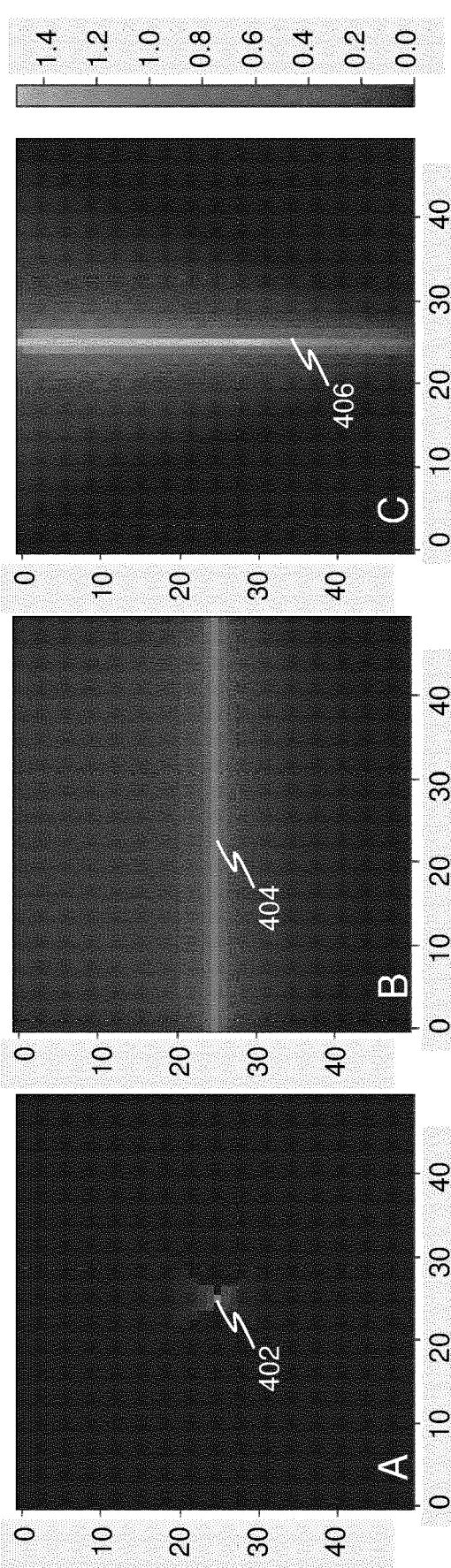
FIG. 4A-4C depict simulated illumination intensities based on ray-optics.

FIG. 4A-4C depict ray-optics-based simulations of light propagation in a build volume in a vertical (x-z) plane that is exposed using an exposure system as described with reference to FIG. 2A. FIG. 4A depicts a relative light intensity map resulting from computation of a single (optimized) exposure image for a target structure corresponding to a single point 402 in the middle of the build volume. This exposure image is focused on the depth of the target structure. The optical axis of the system coincides with the central vertical axis (i.e., in the z-direction) of the image. The build volume is illuminated from the top side.

In this example, light of the first wavelength is focused on a single point, using a single exposure image. The exposure image is focused on a horizontal focal plane through the point. The relative intensity quickly decreases when moving away from the target structure along the z-coordinate (in a direction to or from the optical focusing element). The steepness of the gradient is related to the depth of focus, with a smaller depth of focus leading to a steeper gradient. The depth of focus may be considered a measure for the resolution in the z-direction.

Typically, a smaller depth of focus is associated with a wider light cone. Therefore, outside the focal plane, the same light energy is spread over a larger surface, resulting in a lower intensity. If the light intensity is below a critical level, the chemical reaction may not be activated. This critical level depends on the chemical reaction and the properties of the photosensitive medium. In a fully transparent medium that does not absorb any radiation, the light intensity pattern would be symmetrical around the focal plane. In a more realistic medium where absorption does play a role, the intensity is higher closer to the objective lens. In the direction along the x-axis, the image is sharp at the depth of the focal plane, and becomes spread out at depths away from the focal plane. The profile will be similar to the light cone shown in e.g. FIG. 3A.

FIG. 4B shows the relative intensity of light of a single exposure image computed for a 3D target structure consisting of a horizontal line 404 in the middle of the build volume along the x-axis. The image is the result of illumination with a single exposure image, focused on a focal plane located at the depth of the 3D target structure. To create a horizontal line, an intensity similar to that shown in FIG. 4A may be superimposed for each voxel. Therefore, in the case where the 3D target structure comprises a horizontal line of points, the decrease in intensity in a direction away from the focal plane, and hence the target structure, is much slower. Conceptually, this may be understood as the superposition of light cones resulting from illuminating neighbouring voxels.

FIG. 4C shows the cumulative intensity for a target structure consisting of a vertical line 406 focused in the middle of the build volume along the z-axis. In this case, the sequence of exposure images comprises an exposure image for each focal plane along the z-axis. Each exposure image comprises a single pixel image similar to the image shown FIG. 4A, with varying depths. The resulting cumulative relative intensity map shows a significant amount of 'stray' radiation due to light cones for illuminating voxels at greater depth. In this example, the intensity of radiation is exponentially decreasing according to the Beer-Lambert law of absorption. The absorptivity of the medium in this example is such that 90% of radiation is absorbed at full depth.

In order to reduce or eliminate the effects of such 'stray' radiation, light of a second wavelength may be used to inhibit the chemical reaction and increase the resolution of the target structure. The polymerization rate then depends both on the light intensity of 'activating' light of the first wavelength and on the light intensity of 'inhibiting' light of the second wavelength, as well as on the physical and chemical properties of the photosensitive medium. Thus, in order to increase the resolution along the optical axis (the z-direction), a photo-inhibition effect may be used. For example, the exposure system may be provided with a second source of radiation with a wavelength that is absorbed by the photo-inhibitor but is not absorbed by the photo-initiator.

FIG. 2B depicts an exposure system for illuminating a planar shaped photosensitive medium comprising a photo-initiator and a photo-inhibitor. Such exposure system may comprise a first image formation module 220 to generate a 'positive' exposure image with a wavelength selected to activate the photo-initiator in the photosensitive medium. A 'negative' image may be formed by a second image formation module 222. Light from the first and second image formation modules may be combined using e.g. a dichroic mirror 224. That way, in an embodiment, the 'negative' exposure image may be focused on the same layer as the 'positive' exposure image or on a layer adjacent to the layer with the 'positive' exposure image in a single step. Alternatively, in an embodiment, the 'negative' exposure image may be focused on an adjacent layer to the 'positive' exposure image with a small delay. For example, when the objective makes the next step, while changing the focal length.

In an embodiment, the same or similar image formation module or modules, and the same or similar optical focusing elements may be implemented on the other side of the build volume. If the build volume is accessible from many sides, it may even be irradiated from any direction accessible to the exposure system.

Additionally, a monitoring system 226, e.g. a camera, can be added to measure the transmitted radiation, similarly to a transmission microscopy set-up. Alternatively, or additionally, scattered radiation, or fluorescence radiation may be detected, similar to a confocal microscopy set-up. Such systems can be used to monitor the change in absorptivity, refraction index or concentration of photosensitive compounds in every point of the build volume before, during or after the exposure.

Figures 3A, 3B, 3C:
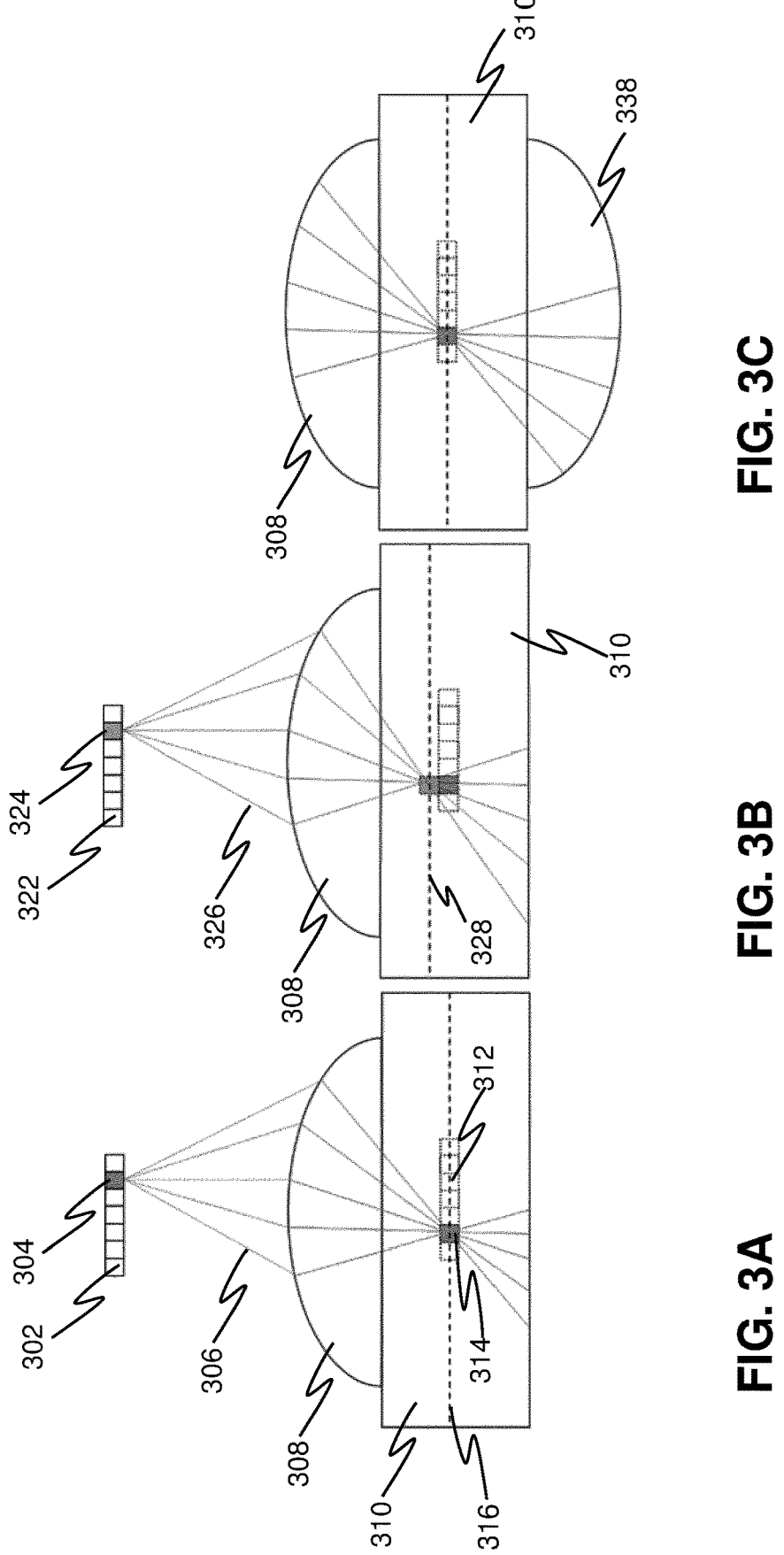
FIG. 3A-3C schematically depicts a cross section through an exposure system according to an embodiment of the invention.

Hence, based on an exposure system of FIG. 3B, a 'negative' pattern can be focused on the adjacent layers to compensate for the activation of photo-initiator outside of the current focal plane. A chemical composition suitable for such approach is described in the article by M. de Beer et al. Science Advances 5(1):eaau8723 (2019) DOI: 10.1126/sciadv.aau8723. This composition comprises a photoinitiator, camphorquinone, which is sensitive to wavelengths in the range between 400 and 500 nm and a photoinhibitor, bis[2-(o-chlorophenyl)-4,5-diphenylimidazole], which is sensitive to wavelengths below 400 nm. Another example of a chemical composition suitable for dual-wavelength approach is described in the article by H. L. van der Laan et al. ACS Macro Lett. 8(8):899-904 (2019) DOI: 10.1021/acsmacrolett9b00412. These composition include trimethylolpropane triacrylate (TMPTA)-based acrylate photopolymerizable resin formulations with a butyl nitrite (NN) as a UV-active photo-inhibitor.

Various monomers were tested in combination with this photo-initiator and photo-inhibitor. Given a certain combination of the photo-initiator, photo-inhibitor and the monomer, absorptivity of the medium will depend on the radiation wavelength, the absorptivity spectra of the compounds that are included in the medium and their respective concentrations. So, an optimal combination of illumination wavelengths and the concentrations of the photo-initiator and photo-inhibitor may be chosen to ensure that the whole build volume can be accessed by the radiation. A transparent monomer with absorptivity close to zero may be used to maximize the radiation penetration depth and to maximize the amount of energy spent on activation of the photosensitive compounds.

FIG. 3A-3C depict cross sectional schematics of part of the exposure systems of FIGS. 2A and 2B. FIG. 3A depicts an image formation module 302 with a pixel 304 radiating light of the first wavelength. The pixel sends out a divergent light cone 306, which is focused by an objective lens 308. The objective lens may comprise a plurality of optical elements, in order to create the desired optical properties. The light propagates through build volume 310, and forms an image 312 of the image formation module in the focal plane 316. The image of pixel 304 is shown as voxel 314.

FIG. 3B depicts the same set-up, but now the build volume 310 is illuminated with light of the second wavelength. Image formation module 322 may be the same device as image formation module 302, configurable to emit light at both wavelengths. Image formation module 322 may also be a different device. In that case, there may be further optics (not shown) between the image formation module and objective lens 308, for instance a dichroic mirror as shown in FIG. 2B. Pixel 324 sends out a divergent light cone 326, which is again focused by the objective lens. The objective lens may have a different focal length at different wavelengths. Consequently, the focal plane 328 may be at a different depth in the build volume for light of the second wavelength than it is for light of the first wavelength. The focal length may also have been actively adjusted between illuminating with the exposure image of the first wavelength and the exposure image of the second wavelength.

FIG. 3C depicts a variant set-up, comprising a second objective lens 338 at a different position relative to the build volume 310. The second objective lens may be positioned opposite the first objective lens 308, or at a different relative position. In an embodiment, the second objective lens may be used to illuminate the build volume from a plurality of directions. This may e.g. increase the resolution of the printed object or increase the maximum thickness of the build volume, especially in a not fully transparent medium. In an embodiment, a first image formation module creating a 'positive' image may use the first objective lens, while a second image formation module creating a 'negative' image may use the second objective lens.

In some embodiments, the build volume may be illuminated by light of the first and second wavelengths simultaneously, while in other embodiments, the first and second wavelengths may alternate. Simultaneous illumination may be obtained with a single image formation module, capable of emitting light of at least the two wavelengths, or using a plurality of image formation modules.

The exposure processes described with reference to FIGS. 2 and 3 require computation of sequences of exposure images based on a given target polymerization rate, which may in turn depend on a target structure. Although the description refers to polymerization, the computation may be analogous for other chemical reaction such as removal and (re)formation of chemical bonds in a photo-decomposing medium.

Accurate modelling of the polymerization kinetics is not a trivial task and can be performed using, for instance, reactive force field or random graph theory. To simplify the calculations, in an embodiment, an empirical linear relation of the type:

$$P_{[L_{\lambda 1}, L_{\lambda 2}]} = \alpha L_{\lambda 1} - \beta L_{\lambda 2} - \gamma$$

may be assumed as an approximation, where $L_{\lambda 1}$ and $L_{\lambda 2}$ are the cumulative intensities of light of the first wavelength and of the second wavelength, respectively. Illumination with exposure images of the first wavelength, selected for activating or initiating the chemical reaction, may be thought of as 'positive' illumination, while illumination with exposure images of the second wavelength, selected for inhibiting the chemical reaction, may be thought of as 'negative' illumination. Parameters $\alpha$, $\beta$ and $\gamma$ are constants that may be determined empirically.

Cumulative intensity fields L(x, y, z) for light of both the first and second wavelengths, i.e. both 'positive' and 'negative' illumination, can be computed by applying a light propagation model $\mathcal{R}$ to the given sequence of exposure images S(x, y, z):

$$L(x,y,z) = \mathcal{R}[S(x,y,z)]$$

Both models may be combined, so that the polymerization rate P may be given by $P = \mathcal{P}[\mathcal{R}[S_{\lambda 1}], \mathcal{R}[S_{\lambda 1}]]$, and, considering their assumed linearity, can be written in the following manner:

$$P = \mathcal{R}[\alpha S_{\lambda 1} - \beta S_{\lambda 2}] - \gamma$$

Here $\alpha S_{\lambda 1} - \beta S_{\lambda 2}$ is a weighted difference between sequence of exposure images of the first and second wavelength, corresponding to the 'positive' and 'negative' exposures. This difference may be replaced with $S_0$ which will contain 'positive' values corresponding to $S_{\lambda 1}$ and 'negative' values corresponding to $S_{\lambda 2}$.

In an embodiment, the model may be simplified by neglecting the time component. This may be justified by assuming that the delay between illumination with exposure images focused at different depths is negligible, compared to the polymerization rate. In a more general embodiment, the time factor may be incorporated in the polymerization rate model $\mathcal{P}$ and/or in the propagation model $\mathcal{R}$.

Finally, the linear model of polymerization can be expressed as follows:

$$P_0(x,y,z) = \mathcal{R}[S_0(x,y,z)] - \gamma.$$

More in general, the polymerization rate may be written as:

$$P_0(x,y,z) = \mathcal{M}[S_0(x,y,z)]$$

where $\mathcal{M}$ is a combined model combining the propagation model, the polymerization model, and possible other models. A solution of the inverse problem can be easily obtained for the linear model. For instance, if in the discrete case $\mathcal{R}$ is expressed via a matrix (or tensor), some type of matrix inversion can be applied to obtain the inverse $\mathcal{R}^{-1}$. In that case, an optimal sequence of exposure images can simply by calculated as:

$$S_0(x,y,z) = \mathcal{R}^{-1}[P_0(x,y,z) + \gamma]$$

Alternatively, an iterative optimization algorithm of some sort can be used, for instance if it is impossible or not feasible to compute $\mathcal{R}^{-1}$, e.g., if the matrix $\mathcal{R}$ representation is too large. A common approach is to use a gradient descent algorithm to minimize a difference between the target polymerization rate $P_0(x, y, z)$ and the predicted rate:

$$\|P_0(x,y,z) - \mathcal{R}[S_0(x,y,z)] + \gamma\|$$

Figure 6:
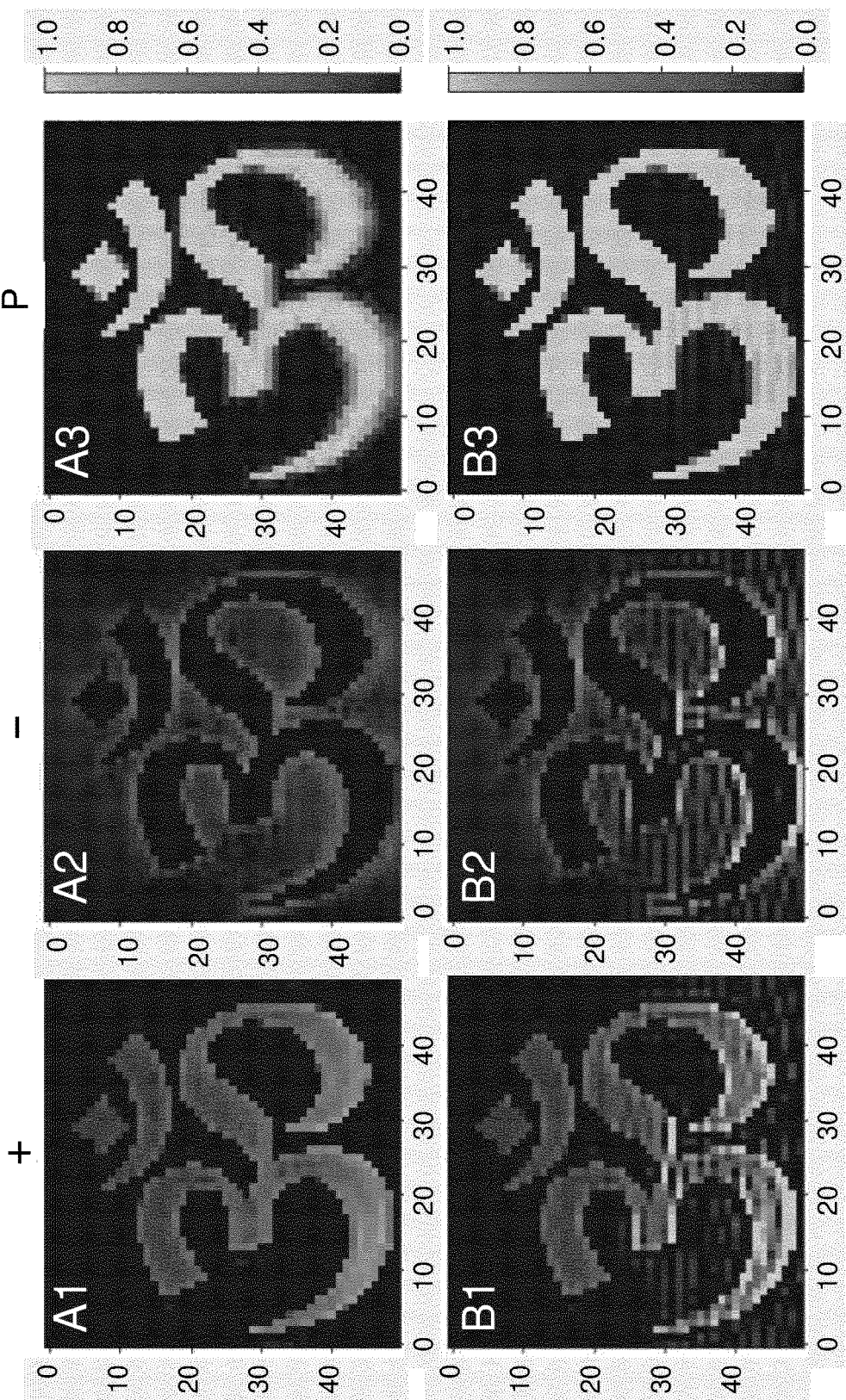
FIG. 6 depicts examples of the optimal sequence of exposure images computed for a complex structure using the matrix inversion and the iterative minimization algorithm.

An example comparing a computation based on an explicit inverse and a computation based on an iterative solution, is depicted in FIG. 6.

As a further alternative, a (linear) pseudo-inverse of $\mathcal{M}$ or $\mathcal{R}$ may be used to compute an approximate solution. Such a pseudo-inverse may e.g. be based on convolutions. This may result in an acceptably accurate and reasonably fast method. Convolutions may be appropriate, since the target illumination for each layer or plane is mainly affected by the illumination of a limited number of adjacent planes.

Figure 5:
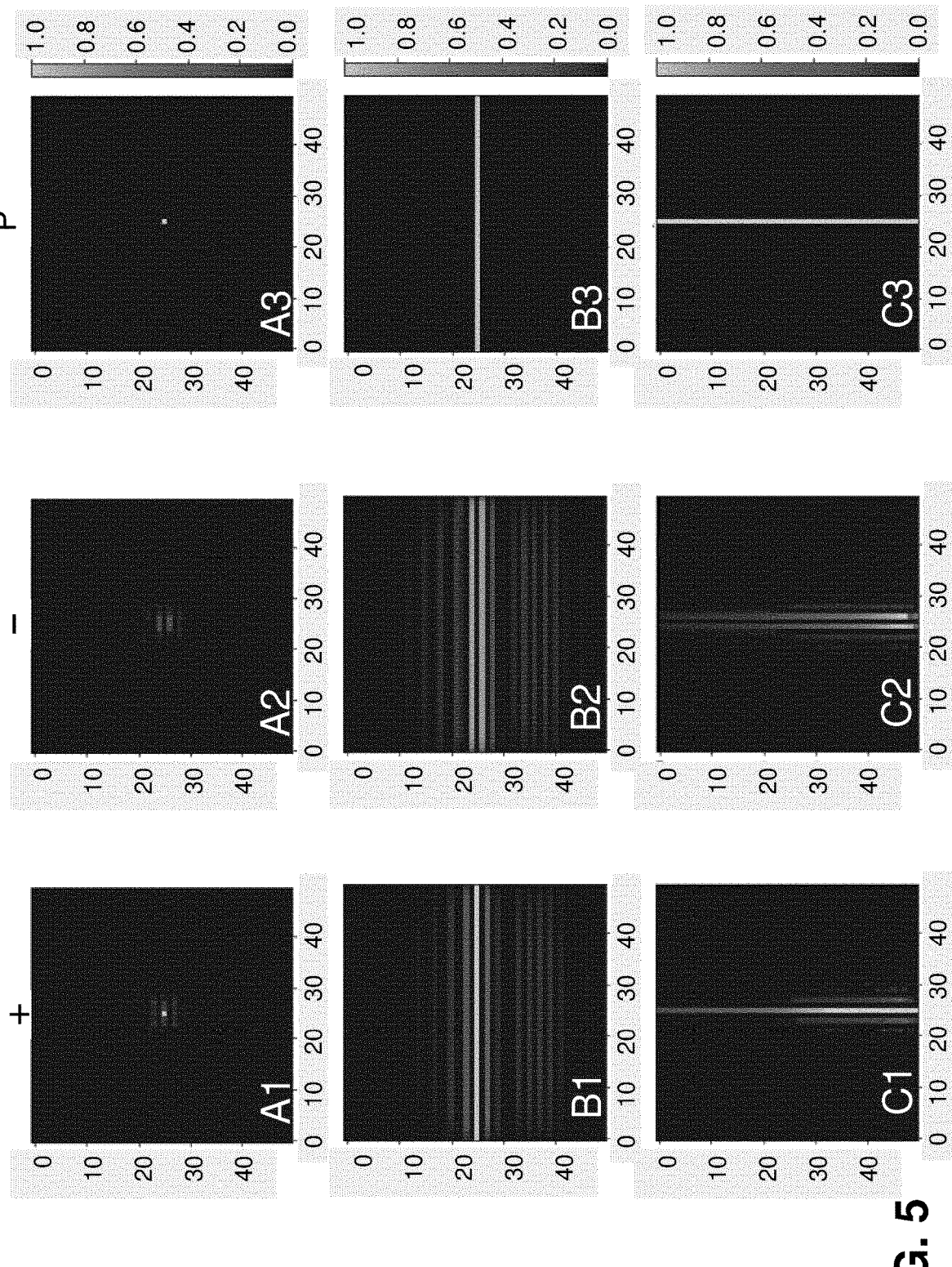
FIG. 5 depicts examples of the optimal sequence of exposure images obtained by solving the linear inverse problem for the light propagation, absorption and subsequent polymerization.

FIG. 5 depicts several simulated examples of the polymerization rate resulting from a computed sequence of exposure images in a central x-z plane, for 3D target structures similar to those depicted in FIG. 4A-4C. The first column, labelled "+", shows computed cumulative intensities resulting from sequences of exposure images of the first wavelength for initiating polymerization, or 'positive' exposures. The second column, labelled "−", shows computed cumulative intensities resulting from a sequences of exposure images of the second wavelength for inhibiting polymerization, or 'negative' exposures. The third column, labelled "P", shows the resulting expected polymerization rates. For example, (A1) and (A2) show 'positive' and 'negative' sequences of exposure images computed for a target polymerization confined to a single point; and (A3) shows the resulting polymerization. Rows (B) and (C) show the results of similar calculations for target structures shaped as a horizontal line and a vertical line respectively. It can be seen that the strongest contribution in the 'negative' exposures correspond to the nearest vicinity of the points illuminated by the 'positive' exposures. The oscillatory behaviour is especially apparent in the (B) row, and may be supressed by using a regularized solver.

The fact that the 'positive' and 'negative' exposure images in close vicinity of each other are strongly correlated, suggests that the process of computing the sequence of exposure images $S_0(x, y, z)$ can be significantly simplified through replacing it by a convolution of the target structure with a kernel of a limited size. Depending on the implementation, such an approach would essentially amount to using a (linear) pseudo-inverse of $\mathcal{M}$ or $\mathcal{R}$. The shape of such kernel could be precalculated for each configuration of the exposure system, e.g. based on a point-spread function of the exposure system. However, in this case, it may be more difficult to take into account possible optical inhomogeneity inside the build volume.

In certain cases, computation of the exposure images can be simplified, and exposure images may be computed based on a pre-computed kernel rather than by computing an exact or approximate solution to an inverse of a mathematical model such as $\mathcal{M}$ or $\mathcal{R}$. The kernel may comprise a pattern of a plurality of pixels encoding or representing a light intensity of light of the first and/or second wavelengths.

As shown in FIG. 5, generation of simple point-like, line-like or sheet-like structures is possible by repeating projection of identical kernels or patterns throughout at least part of the build volume. A kernel for a line-like structure would typically correspond to a bright central point of the first wavelength, initiating polymerization, surrounded by points of the second wavelength, inhibiting polymerization outside of the centre of the kernel. This approach can be used for printing dots, wireframes, lattices, filaments and other similar structures. The kernel may be based on a point spread function of the exposure system.

For example, one or more lines parallel to the optical axis of the exposure system may be created by illuminating the build volume with a series of identical exposure images, each exposure image comprising, for each of the one or more lines, a kernel comprising one or more pixels corresponding to light of the first wavelength surrounded, in each direction in the plane of the exposure image, by pixels corresponding to light of the second wavelength. The number of pixels corresponding to light of the first wavelength may depend on the diameter of the line-like structure. In some embodiment, the kernel may comprise pixels in the exposure images (immediately) preceding and following the first exposure image, focussed at neighbouring or adjacent planes along the optical axis.

FIG. 6 depicts simulated examples of the polymerization rate for two simulation methods for computing a sequence of exposure images. In particular, FIG. 6 shows results for sequences optimized via iterative optimization (A1-A3) and via explicit matrix inversion (B1-B3) for a complex target structure, the Aum sign. Similar to FIGS. 5 (A1) and (A2) show 'positive' and 'negative' illumination intensities, respectively, i.e., cumulative intensities of light of the first and second wavelength, respectively, due to illumination with a sequence of exposure images. (A3) shows the resulting polymerization rate. In (A1) and (A2), the sequence of exposure images has been computed using a constant step gradient descent method (with 200 iterations). In this example, the result is not very sharp at the bottom of the build volume. However, better results may generally be obtained by increasing the number of iterations.

In the depicted example, a sharper image is achieved using an explicit inverse of the propagation matrix instead of an iterative solution, as shown in the second row (B1-B3). (B1) and (B2) again show cumulative intensities of light of the first and second wavelength, respectively, due to illumination with a sequence of exposure images, while (B3) shows the resulting polymerization rate. Other methods may use e.g. convolutions or other approximations to the combined model and/or its inverse to determine the sequence of exposure images in a sufficiently fast and reasonably accurate manner.

Figure 7:
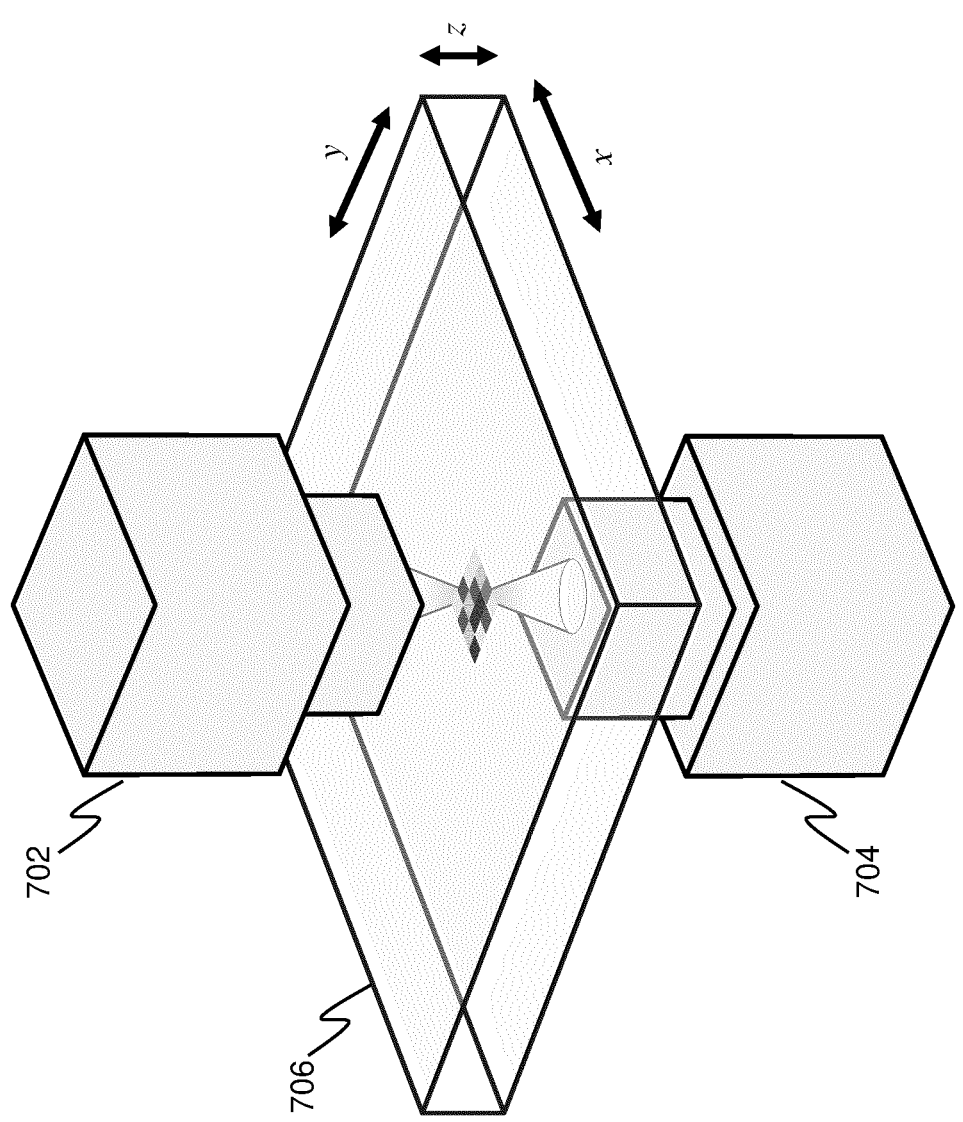
FIG. 7 depicts a schematic of an exposure system according to an embodiment of the invention.

FIG. 7 depicts a schematic of an exposure system according to an embodiment of the invention. In particular, FIG. 7 depicts an exposure system comprising two illumination systems 702,704, designed to address a large build volume 706. The build volume may be mounted on a stage or holder. In the depicted example, the illumination systems are positioned to illuminate the build volume from two opposite sides. Such a set-up can be used to increase the speed of z-scanning or to increase the addressable depth of the build volume, which may be limited by high absorptivity or by the mechanical properties of the z-scanning system. The stage may further be movable in lateral (x, directions to change the relative position of the build volume in the lateral directions relative to the exposure system, in order to increase the lateral build volume size.

In an embodiment, one illumination system may be used to illuminate the build volume with 'activating' light of the first wavelength, while the other illumination system may be used to illuminate the build volume with 'inhibiting' light of the second wavelength. In a different embodiment, both illumination systems may illuminate the build volume with light of both the first and second wavelength.

Figure 8:
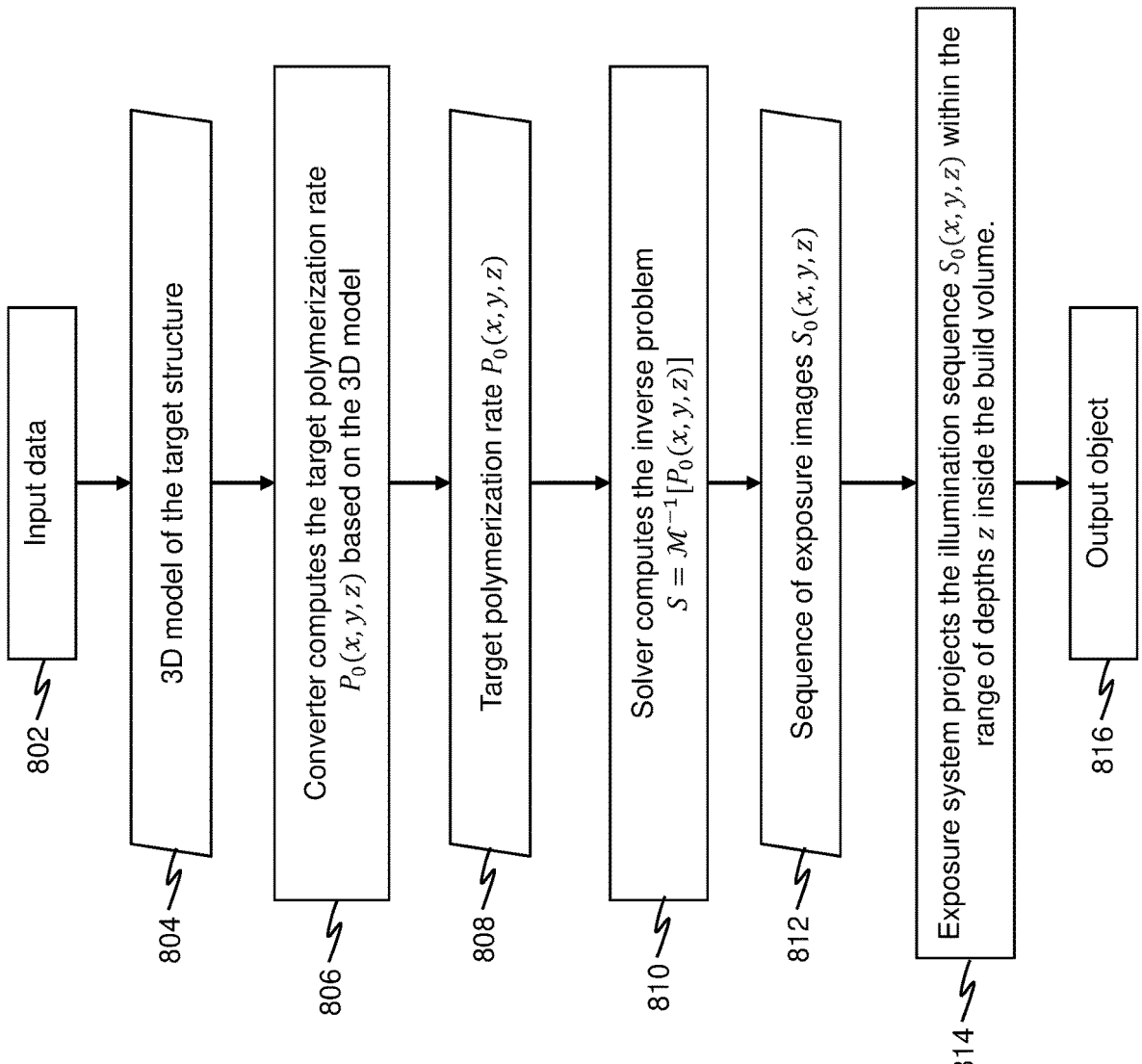
FIG. 8 depicts a flow diagram of a method of volumetric microlithography according to an embodiment of the invention.

FIG. 8 depicts a flow diagram of a method of determining a sequence of exposure images and a method of controlling an exposure system based on such exposure images according to various embodiments of the invention. The method of determining a sequence of exposure images may include determining a sequence of exposure images based on a target polymerization rate for a target zone, preferably a 3D target zone.

The method may be implemented on a computer in the form of program code stored in the memory of the computer. The program code may be executed by a processor of the computer thereby enabling the computer to determine a sequence of exposure images and corresponding depths of a focal plane in a build volume, which can be used to control an exposure system, e.g. a system as described with reference to FIG. 2. The computed sequence of exposure images may be used to control and generate a plurality of depth-dependent exposure images to realize a desired chemical process (e.g. photopolymerization) of the photosensitive medium in the target zone so that a photopolymerized build volume is shaped according to the 3D target structure.

In a first step 802, input data may be received by a processor of a computer. The input data may comprise a 3D scan of an object, a computer-generated 3D model such as a CAD model. An input data set may comprise point cloud data, mesh data, surface data, volume data, or any other suitable data type for representing a 3D model of an object. In step 804, a model of a 3D target structure is created, based on the input data. In a next step 806, the 3D target structure may be converted in a volumetric target polymerization rate $P_0(x, y, z)$. The volumetric target polymerization rate may include a first value in parts (positions) of a build volume where polymerization is desired to occur, and a second value, different from the first value, in parts of the build volume where no polymerization should occur. Depending on the type of photosensitive medium and the purpose of the construction, the target volume may have to be irradiated or to remain unaltered (e.g. a 'positive' exposure image and/or a 'negative' exposure image may be created).

The processor may then compute, in step 810, an exposure image based on a model and the volumetric target polymerization. For example, in an embodiment, an exposure image S may be determining by solving the inverse problem $S = \mathcal{M}^{-1}[P_0(x, y, z)]$. In general, the (combined) model $\mathcal{M}$ may comprise e.g. a light propagation model $\mathcal{R}$ and a polymerization model $\mathcal{P}$. In an embodiment, the combined model $\mathcal{M}$ may be a linear model or approximated to a linear model and a solution may be obtained by solving a linear system of equations using known linear algebra methods. In other embodiments, an analytical solution may not be possible or undesirable, and other methods may be used to solve the problem, e.g. an iterative method such as a gradient descent method or a method based on a (linear) pseudo-inverse of $\mathcal{M}$.

In a next step 812, a sequence of exposure images $S_0(x, y, z)$ is obtained from the solution S. In a typical embodiment, this sequence comprises 2D 'positive' and 'negative' exposure images for a range of axial values corresponding to a range of focal plane depths (relative to the build volume). In various embodiment, 'positive' and 'negative' exposure images may be combined or may be separate images. The axial values may be identical for the 'positive' and 'negative' images or may be different, e.g. shifted over half the depth of focus of the exposure system. In an embodiment with more than one illumination system, as shown e.g. in FIG. 7, a sequence of exposure images may be determined for each illumination system in the exposure system.

The exposure system uses, in a next step 814, the sequence of exposure images $S_0(x, y, z)$ to irradiate the build volume. In a typical embodiment, for each focal plane position z in the build volume, a 'positive' and/or 'negative' exposure image may be projected in a focal plane in the build volume. Other embodiments may irradiate the build volume by 'scanning' the two-dimensional exposure images line by line or pixel by pixel.

In a last step 816, an output object is obtained. This may comprise waiting for the initiated polymerization to finish curing. This step may also comprise removing the cured or otherwise treated object from the medium. In some embodiments, this step may also comprise a developing step and/or a chemical of physical vapour deposition step or an etching step. This way, objects of different materials may be obtained.

Figure 9:
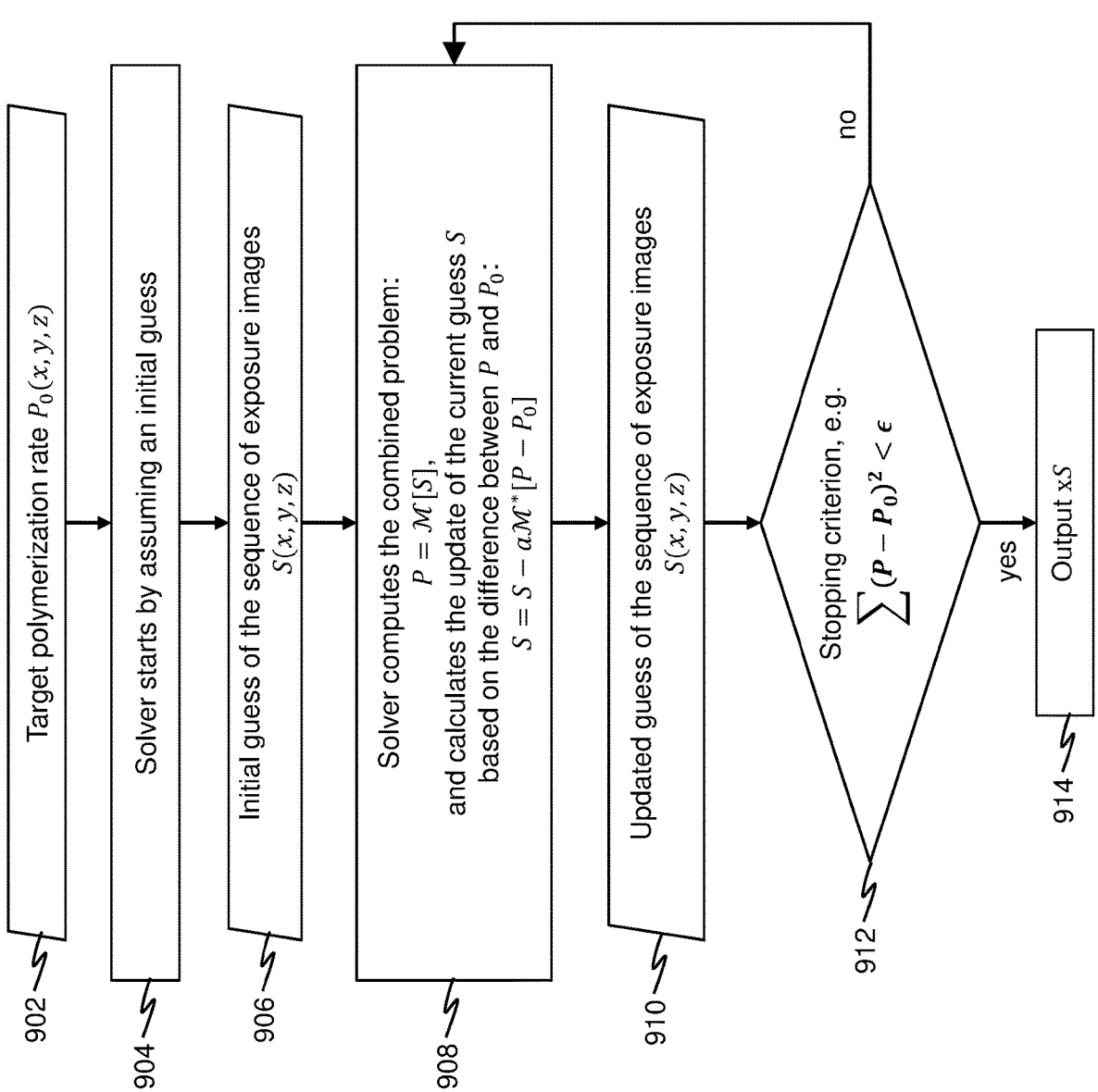
FIG. 9 depicts a flow diagram of a method of determining a sequence of exposure images according to an embodiment of the invention.

FIG. 9 depicts a flow diagram of a method of determining a sequence of exposure images according to an embodiment of the invention. In particular, the method determines a sequence of exposure images using an iterative computational method. The method may be implemented on a computer in the form of program code stored in the memory of the computer. The program code may be executed by a processor of the computer thereby enabling the computer to determine a sequence of exposure images and corresponding depths of a focal plane in a build volume. The method may, either completely or partly, be executed in step 810 as discussed with reference to FIG. 8.

In a first step, a volumetric target polymerization rate $P_0(x, y, z)$ 902 may be obtained and provided to a processor of a computer. In a next step 904, the processor may start by assuming an initial polymerization rate. This may be a default estimated polymerization rate, which may be estimated based on some properties of the target polymerization rate $P_0(x, y, z)$. This results in an initial estimation of the sequence of exposure images $S(x, y, z)$ 906. Based on this initial estimation, in a next step 908, the processor may compute the resulting volumetric polymerization rate P(x, y, z). This may comprise using a light propagation model $\mathcal{R}$ and/or a polymerization model $\mathcal{P}$, or e.g. a combined model $\mathcal{M}$. Based on a difference between the computed polymerization rate and the target polymerization rate, the processor may determine an updated estimation for the sequence of exposure images. The updated estimation may be found using e.g. a gradient descent method when $\mathcal{M}^*$ or the so-called adjoint of the model $\mathcal{M}$ is known. The updated polymerization rate may be computed and compared 912 with the target polymerization rate. The process may continue to update its estimate until a stopping criterion has been met. When that is the case, the final sequence of exposure images may be provided as output 914.

FIG. 10 depicts a flow diagram describing a method of 'confocal' or volumetric microlithography according to an embodiment of the invention. The method may include determining a sequence of exposure images based on a 3D target structure and modelled properties of a photosensitive medium, such as light propagation, light absorption, and a chemical reaction rate, e.g. a polymerization rate. The method may be implemented on a computer in the form of program code stored in the memory of the computer. The program code may be executed by a processor of the computer thereby enabling the computer to determine a sequence of exposure images which can be used to control an exposure system, e.g. a system as described with reference to FIG. 2. The computed sequence of exposure images may be used to control and generate a plurality of depth-dependent exposures leading to a desired chemical reaction, e.g. photopolymerization, in a target zone related to the 3D target structure. The sequence of exposure images may comprise light of a first wavelength, initiating or activating the chemical reaction, and light of a second wavelength, inhibiting the chemical reaction.

In a first step 1002, a data representation representing a 3D structure may be provided to a computer that is connected to an exposure system for illumination of a build volume, e.g. an exposure system described with reference to FIG. 2.

In a second step 1004, the computer may determine a plurality of planes in a build volume, each of the plurality of planes associated with a depth in the build volume along an optical axis of the exposure system. The planes are typically perpendicular to the optical axis of the exposure system. The planes are typically equidistant planes. The distance between the planes may depend on properties of the exposure system, e.g. its depth of focus, or the step size with which the exposure system can adjust the vertical position of the focal plane relative to the build volume.

The build volume may comprise a photosensitive medium including an activation compound for initiating a chemical reaction in the photosensitive medium, and, preferably, an inhibition compound for inhibiting the chemical reaction. The activation compound may be activatable by light of a first wavelength and the inhibition compound may be activatable by light of a second wavelength, different from the first wavelength. While an activation compound may be sufficient to create a structure in the photosensitive medium, the addition of an inhibition compound may e.g. increase the resolution or the maximum size of the structure in the vertical dimension.

In a next step 1006, the computer may use the data representation of the structure to determine a target zone in the photosensitive medium. The computer may compute, based on a shape of the structure, a sequence of exposure images with may be used illuminate the build volume. Each exposure image of the sequence of exposure images is associated with a plane of the plurality of planes, and hence with a corresponding depth in the build volume. Each exposure image comprises light of the first wavelength to initiate or activate the chemical reaction and/or light of the second wavelength to inhibit the chemical reaction. As was explained above, the final reaction rate may depend on a superposition of all exposure images.

The sequence of exposure images may be computed using a reaction rate model, e.g. a polymerization model, and a propagation model. The models may be combined into a single model. Advantageously, linear models may be used. The computation may comprise e.g. explicitly inverting a combined model, or iterative solving of the model. Any suitable coordinate system may be used. In an embodiment, for each plane, an activation exposure image and an inhibition exposure image are computed. In a different embodiment, activation and inhibition planes may e.g. alternate, or be slightly moved to each other, e.g. due to properties of the optical system.

In a next step 1008, the computer may control the exposure system to illuminate the build volume with the sequence of exposure images. In particular, for each of the plurality of planes, the computer may control the exposure system to position a focal plane of the exposure system at the depth in the build volume associated with the respective plane and to illuminate the build volume with the exposure image associated with the respective plane. The cumulative illumination with light of the first and, preferably, second wavelengths may lead to a controlled chemical reaction in a target zone in a photosensitive medium, for example photopolymerization in a zone that corresponds to the structure that was provided to the computer in the first step. An embodiment of this step is described in more detail with reference to FIG. 11.

FIG. 11 depicts a flow diagram describing a method illuminating a build volume according to an embodiment of the invention. The method may be executed by an exposure system. The exposure system may comprise a computer controlling parts of the exposure system. The method may be implemented in the form of program code stored in the memory of the computer. The program code may be executed by a processor of the computer thereby enabling the computer to control parts of the exposure system to illuminate the build volume with a sequence of exposure images. The sequence of exposure images may be computed by the computer, e.g. based on a data representation of a 3D structure, or may be received from a computation unit.

In a first step 1102, the computer may configure the exposure system to position the build volume comprising a photosensitive medium at a first position, such that a focal plane of the optical system is located at a first depth within the build volume. In a typical embodiment, the system may start at a top layer or bottom layer of the build volume. The build volume may be held in a holder, e.g. a container, and may be placed on a stage, optionally a movable stage.

The build volume may comprise a photosensitive medium including an activation compound for initiating a chemical reaction in the photosensitive medium, and, preferably, an inhibition compound for inhibiting the chemical reaction. The activation compound may be activatable by light of a first wavelength and the inhibition compound may be activatable by light of a second wavelength, different from the first wavelength. While an activation compound may be sufficient to create a structure in the photosensitive medium, the addition of an inhibition compound may e.g. increase the resolution or the maximum size of the structure in the vertical dimension.

In a next step 1104, the computer system may control an image formation module of the exposure system, e.g. a light source and a spatial light modulator, to illuminate the build volume with an activation exposure image. It should be noted that the exposure system illuminates the entire depth or thickness of the build volume, but that the image of the exposure image is focused on the focal plane.

In an optional step 1106, the computer system may control an image formation module of the exposure system to illuminate the build volume with an inhibition exposure image of light of the second wavelength. In an embodiment, steps 1104 and 1106 may be combined into a single step. In a different embodiment, the order of steps 1104 and 1106 may be inversed.

In a next step 1108, the computer may configure the exposure system to repositioning the focal plane relative to the build volume, such that a focal plane of the optical system is located at a new depth within the build volume. In a preferred embodiment, the exposure system comprises adjustable optics. In that case and the focal plane may be moved relative an objective lens of the adjustable optics along the optical axis of the system, and the build volume may remain stationary relative to the objective lens. In a different embodiment, the focal length of the system may remain stationary, but the build volume is moved relative to the optics in a direction parallel to the optical axis. In an embodiment, step 1108 may be repeated between steps 1104 and 1106.

Steps 1104-1108 may be repeated until the entire sequence of exposure images has been used to illuminate the build volume. In a typical embodiment, the exposure system will scan through the build volume, moving the focal plane to adjacent layers in the build volume. In an embodiment, there can be an additional repositioning step between illuminating with the activation field and illuminating with the inhibition field.

Figure 12C:
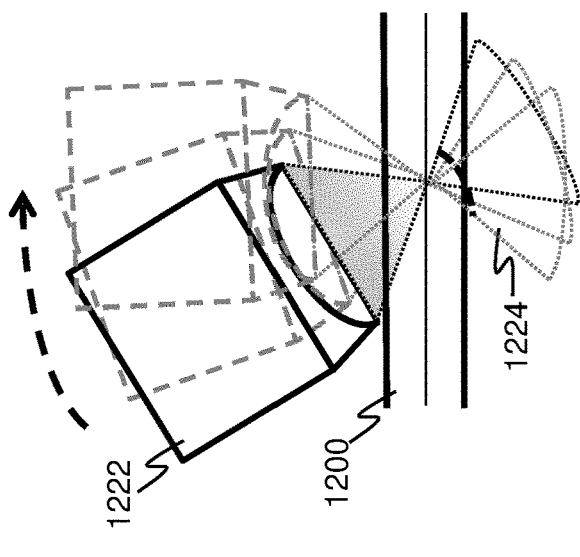
FIG. 12A-C depict arrangements for one or more exposure system objectives that may be used in an embodiment of the invention.
Figure 12B:
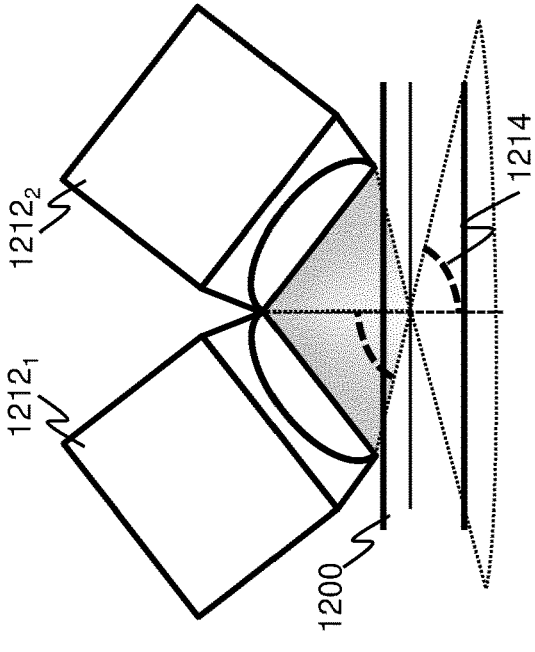
Figure 12A:
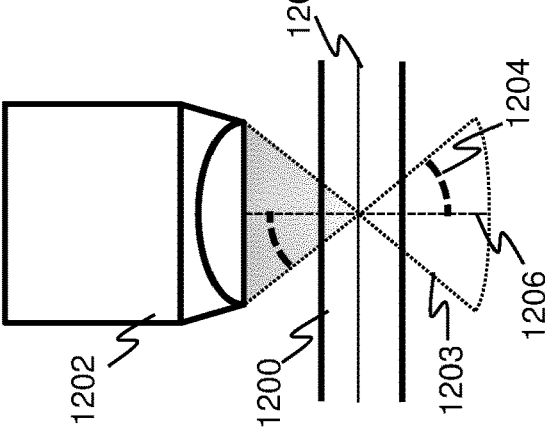

FIG. 12A-C depict arrangements for one or more objectives that may be used in an embodiment of the invention. In general, the resolution of an optical system depends on the Numerical Aperture (NA) of the objective. The numerical aperture is defined as the product of the refraction index with the sine of half the aperture angle of the light cone created by the lens. A so-called dry objective, using air as a medium which has a refractive index of 1.0, can have a NA up to 1.0. This corresponds to an aperture angle of 180°, which is practically not feasible. Objectives immersed in a medium with a higher refractive index, e.g. oil immersion objectives using oil having a refractive index of about 1.5, may reach higher NA values and, therefore, higher resolution. As was explained in more detail above with reference to FIG. 2, the depth of focus is inversely related to the numerical aperture of the objective. Therefore, a high-numerical aperture system may achieve is high resolution in all three dimensions.

FIG. 12A depicts a typical objective 1202 illuminating a build volume 1200 with a light cone 1203 with a half aperture angle 1204. The light cone further defines an optical axis 1206 and a focal plane 1208.

In order to increase the effective numerical aperture of the exposure system, multiple objectives and/or one or more moving objectives may be used.

FIG. 12B depicts an embodiment with two objectives 1212$_{1,2}$ oriented at different angles to the build volume 1200. The effective half aperture angle 1214, and thus the effective numerical aperture, of the combined objectives is larger than the numerical aperture of each of the individual objectives.

In such an embodiment, an exposure image may be computed for each objective, for each focus plane or depth in the build volume. The build volume may be illuminated by a plurality of exposure image simultaneously or subsequently. Analogous optical systems can be found in the field of stereomicroscopy or Light-Sheet Microscopy (LSM), where a first objective is used to project excitation light and a second objective captures fluorescence light emitted by the specimen. In other embodiments, more than two, e.g. three, four, six or more than six, objectives may be used.

FIG. 12C depicts an embodiment with a movable objective 1222 configured to move between a plurality of positions (indicated with dashed lines). The orientation of the objective relative to the build volume 1200 may change to project at different angles at each depth. The effective half aperture angle 1224, and thus the effective numerical aperture, of the moving objectives is larger than the numerical aperture of the (stationary) objective itself.

In such an embodiment, instead of pre-computing and projecting a single exposure image at each depth, a plurality of images may be projected at each depth, i.e. for each focus plane, while the orientation of the objective is changed with respect to the build volume. Depending on the implementation, an exposure image may be computed for each of a plurality of predetermined positions, or the exposure image may be continuously adapted while the objective moves. In an embodiment, the objective may rotate around an axis parallel to a surface of the build volume. In a different embodiment, the objective may rotate around an axis perpendicular to the build volume, or the build volume may be mounted on a rotatable stage.

Embodiments with a plurality of objectives or with one or more objectives that are movable with respect to the build volume may offer a way to increase the resolution of the system beyond the limits dictated by the parameters of a single objective, thus leading to a higher resolution and/or smaller details in a created object.

Figure 13:
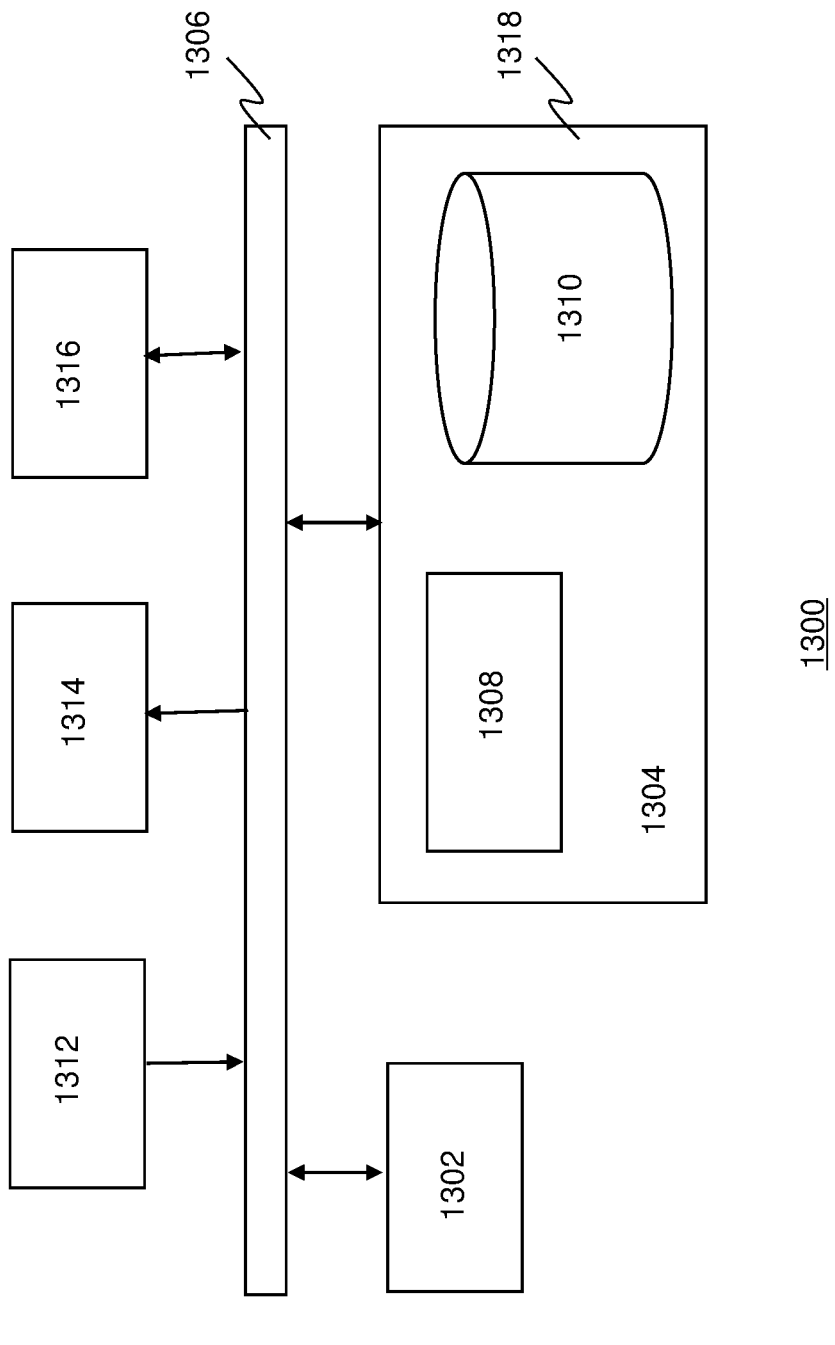
FIG. 13 is a block diagram illustrating an exemplary data computing system that may be used for executing methods and software products described in this disclosure.

FIG. 13 is a block diagram illustrating an exemplary data processing system that may be used in as described in this disclosure. Data processing system 1300 may include at least one processor 1302 coupled to memory elements 1304 through a system bus 1306. As such, the data processing system may store program code within memory elements 1304. Further, processor 1302 may execute the program code accessed from memory elements 1304 via system bus 1306. In one aspect, data processing system may be implemented as a computer that is suitable for storing and/or executing program code. It should be appreciated, however, that data processing system 1300 may be implemented in the form of any system including a processor and memory that is capable of performing the functions described within this specification.

Memory elements 1304 may include one or more physical memory devices such as, for example, local memory 1308 and one or more bulk storage devices 1310. Local memory may refer to random access memory or other non-persistent memory device(s) generally used during actual execution of the program code. A bulk storage device may be implemented as a hard drive or other persistent data storage device. The processing system 1300 may also include one or more cache memories (not shown) that provide temporary storage of at least some program code in order to reduce the number of times program code must be retrieved from bulk storage device 1310 during execution.

Input/output (I/O) devices depicted as input device 1312 and output device 1314 optionally can be coupled to the data processing system. Examples of input device may include, but are not limited to, for example, a keyboard, a pointing device such as a mouse, or the like. Examples of output device may include, but are not limited to, for example, a monitor or display, speakers, or the like. Input device and/or output device may be coupled to data processing system either directly or through intervening I/O controllers. A network adapter 1316 may also be coupled to data processing system to enable it to become coupled to other systems, computer systems, remote network devices, and/or remote storage devices through intervening private or public networks. The network adapter may comprise a data receiver for receiving data that is transmitted by said systems, devices and/or networks to said data and a data transmitter for transmitting data to said systems, devices and/or networks. Modems, cable modems, and Ethernet cards are examples of different types of network adapter that may be used with data processing system 1350.

As pictured in FIG. 13, memory elements 1304 may store an application 1318. It should be appreciated that data processing system 1300 may further execute an operating system (not shown) that can facilitate execution of the application. Application, being implemented in the form of executable program code, can be executed by data processing system 1300, e.g., by processor 1302. Responsive to executing application, data processing system may be configured to perform one or more operations to be described herein in further detail.

In one aspect, for example, data processing system 1300 may represent a client data processing system. In that case, application 1318 may represent a client application that, when executed, configures data processing system 1300 to perform the various functions described herein with reference to a "client". Examples of a client can include, but are not limited to, a personal computer, a portable computer, a mobile phone, or the like. In another aspect, data processing system may represent a server. For example, data processing system may represent an (HTTP) server in which case application 1318, when executed, may configure data processing system to perform (HTTP) server operations. In another aspect, data processing system may represent a module, unit or function as referred to in this specification.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A method of volumetric microlithography comprising:
receiving a data representation of a 3D target structure;
determining a plurality of planes in a volume of a photosensitive medium in a build volume, each plane of the plurality of planes associated with a respective depth of a plurality of depths in the build volume, the plurality of depths being defined along an optical axis of an exposure system, each plane corresponding to a possible position of a focal plane of the exposure system, the depths in the plurality of depths being mutually different, the photosensitive medium including an activation compound for initiating a chemical reaction in the photosensitive medium, the activation compound being activatable by light of a first wavelength, and an inhibition compound for inhibiting the chemical reaction, the inhibition compound being activatable by light of a second wavelength, different from the first wavelength;
computing, based on a shape of the 3D target structure, a sequence of exposure images, each exposure image of the sequence of exposure images being associated with a plane of the plurality of planes, and each exposure image comprising light of the first wavelength and/or light of the second wavelength, wherein the computing the sequence of exposure images comprises computing the sequence of exposure images based on a model $\mathcal{M}$ for predicting a chemical reaction rate due to the sequence of exposure images being projected into the photosensitive medium; and
based on at least part of the plurality of planes, controlling the exposure system to position the focal plane of the exposure system at the depth in the build volume associated with the respective plane and to illuminate the build volume with the exposure image associated with the respective plane.

2. The method as claimed in claim 1, wherein the photosensitive medium comprises a photoresist.

3. The method as claimed in claim 1, wherein controlling an exposure system to position a focal plane of the exposure system comprises the exposure system adapting a focal length of the exposure system and/or moving the build volume relative to the exposure system.

4. The method as claimed in claim 1, wherein controlling the exposure system to illuminate the build volume with the exposure image associated with the respective plane comprises:
controlling a first and/or second light source to generate light of the first and/or second wavelength and controlling a spatial light modulator to modulate the light according to the exposure image; or
controlling a controllable display to generate light of the first and/or second wavelength in a pattern according to the exposure image.

5. The method as claimed in claim 1, further comprising: transferring the structure to a final object.

6. The method as claimed in claim 1, further comprising:
dividing the build volume in a plurality of blocks, each block in the plurality of blocks having a lateral extent not larger than the field of view of the exposure system; and
moving the build volume relative to the exposure system along one or more directions of the lateral extent in accordance with dimensions of a block;
and wherein computing a sequence of exposure images further comprises computing a sequence of exposure images for each block of the plurality of blocks.

7. The method as claimed in claim 1, wherein the 3D target structure comprises a plurality of identical point-like, line-like or sheet-like structures; and
computing a sequence of exposure images comprises determining a kernel for initiating the chemical reaction according to the point-like, line-like or sheet-like structure, and repeating the kernel within in one or more of the exposure images.

8. The method as claimed in claim 1, wherein the model $\mathcal{M}$ is a combination of a linear propagation model and a linear polymerization model, and the computing the sequence of exposure images comprises solving $S_0 = \mathcal{M}^{-1}[P_0(x, y, z)]$, wherein $S_0$ is the sequence of exposure images, $\mathcal{M}^{-1}$ is an inverse model of the model $\mathcal{M}$, and wherein $P_0(x, y, z)$ is a target chemical reaction rate at a position in the build volume with spatial coordinates $\{x, y, z\}$ and solving $S_0 = \mathcal{M}^{-1}[P_0(x, y, z)]$ comprises computing an explicit inverse of the model $\mathcal{M}$.

9. The method as claimed in claim 1, wherein the computing the sequence of exposure images comprises solving $S_0 = \mathcal{M}^{-1}[P_0(x, y, z)]$ wherein $S_0$ is the sequence of exposure images and $\mathcal{M}^{-1}$ is an inverse model of the model $\mathcal{M}$, and wherein solving $S_0 = \mathcal{M}^{-1}[P_0(x, y, z)]$ comprises iteratively computing an approximate solution $S_0$, the computing including minimizing a difference between the target chemical reaction rate $P_0$ and a chemical reaction rate $P(S_0)$ achieved due to illuminating the build volume with the sequence of exposure images $S_0$, or wherein solving $S_0 = \mathcal{M}^{-1}[P_0(x, y, z)]$ comprises determining an approximation of the model M or the inverse model $M^{-1}$.

10. The method as claimed in claim 1, further comprising:
detecting light of an exposure image, the light having interacted with the photosensitive medium; and
using the detected light to determine optical properties of the photosensitive medium.

11. The method as claimed in claim 10, further comprising updating the computed sequence of exposure images based on a difference between the determined optical properties and predicted optical properties.

12. The method as claimed in claim 1, wherein the computing a sequence of exposure images comprises computing a plurality of exposure images for each plane of the plurality of planes, each exposure image being associated with a different objective of a plurality of objectives or with a different position of an objective configured to move between a plurality of positions relative to the build volume, the one or more objectives being configured to illuminate the build volume.

13. A non-transitory computer-readable storage medium storing at least one software code portion, the software code portion, when executed or processed by a computer, being configured to perform the method as claimed in claim 1.

14. A computation module for a volumetric microlithography system comprising a computer readable storage medium having at least part of a program embodied therewith, and a processor coupled to the computer readable storage medium, wherein responsive to executing the computer readable storage code, the processor is configured to perform executable operations comprising:

receiving a data representation of a 3D target structure;

determining a plurality of planes in a volume of a photosensitive medium in a build volume, each plane of the plurality of planes associated with a respective depth of a plurality of depths in the build volume, the plurality of depths being defined along an optical axis of an exposure system, each plane corresponding to a possible position of a focal plane of the exposure system, the depths in the plurality of depths being mutually different, the photosensitive medium including an activation compound for initiating a chemical reaction in the photosensitive medium, the activation compound being activatable by light of a first wavelength, and an inhibition compound for inhibiting the chemical reaction, the inhibition compound being activatable by light of a second wavelength, different from the first wavelength; and computing, based on a shape of the 3D target structure and/or properties of the photosensitive medium and/or specifications of the exposure system, a sequence of exposure images, each exposure image of the sequence of exposure images being associated with a plane of the plurality of planes, and each exposure image comprising light of the first wavelength and/or light of the second wavelength, wherein the computing the sequence of exposure images comprises computing the sequence of exposure images based on a model $\mathcal{M}$ for predicting a chemical reaction rate due to the sequence of exposure images being projected into the photosensitive medium.

15. The computation module as claimed in claim 14, wherein the 3D target structure comprises a plurality of identical point-like, line-like or sheet-like structures; and wherein computing a sequence of exposure images comprises determining a kernel for the point-like, line-like or sheet-like structure, and repeating the kernel within each exposure image and/or in a plurality of the exposure images.

16. The computation module as claimed in claim 14, wherein the computing the sequence of exposure images comprises solving $S_0=\mathcal{M}^{-1}[P_0(x, y, z)]$, wherein $S_0$ is the sequence of exposure images, $\mathcal{M}^{-1}$ is an inverse model of the model $\mathcal{M}$, and wherein $P_0(x, y, z)$ is the target chemical reaction rate at a position in the build volume with spatial coordinates $\{x, y, z\}$ and the model $\mathcal{M}$ is a combination of a linear propagation model and a linear polymerization model, and solving $S_0=\mathcal{M}^{-1}[P_0(x, y, z)]$ comprises computing an explicit inverse of the model $\mathcal{M}$.

17. The computation module as claimed in claim 14, wherein the computing the sequence of exposure images comprises solving $S_0=\mathcal{M}^{-1}[P_0(x, y, z)]$, wherein $S_0$ is the sequence of exposure images and $\mathcal{M}^{-1}$ is an inverse model of the model $\mathcal{M}$, and solving $S_0=\mathcal{M}^{-1}[P_0(x, y, z)]$ comprises iteratively computing an approximate solution $S_0$, the computing including minimizing a difference between the target chemical reaction rate $P_0$ and a chemical reaction rate $P(S_0)$ achieved due to illuminating the build volume with the sequence of exposure images $S_0$, or wherein solving $S_0=\mathcal{M}^{-1}[P_0(x, y, z)]$ comprises determining an approximation of the model $\mathcal{M}$ or the inverse model $\mathcal{M}^{-1}$.

18. An exposure system for volumetric microlithography, comprising:

a holder for holding a build volume, the build volume comprising a photosensitive medium including an activation compound for initiating a chemical reaction in the photosensitive medium, the activation compound being activatable by light of a first wavelength, and an inhibition compound for inhibiting the chemical reaction, the inhibition compound being activatable by light of a second wavelength, different from the first wavelength;

optics configured to create a focal plane with a depth of focus that is thin compared to a thickness of the build volume in a direction parallel to an optical axis of the optics;

a first image formation module for generating an exposure image of the first wavelength in dependence of a position of the focal plane relative to the build volume;

a second image formation module for generating an illumination of the second wavelength in dependence of the position of the focal plane relative to the build volume; and a processor, configured for receiving information defining a sequence of exposure images of the first and/or second wavelength, each exposure image of the sequence of exposure images being associated with a depth in the build volume along an optical axis of the optics, and for each exposure image:

controlling the optics and/or the holder to position the focal plane of the optics system at the depth in the build volume associated with the respective exposure image; and controlling the first and/or second image formation module to illuminate the build volume with the respective exposure image.

19. The exposure system as claimed in claim 18, wherein the optics are adjustable optics configured to create a focal plane with a dynamically adjustable focal length and/or wherein the holder is configured to be movable relative to the optics in a direction parallel to the optical axis.

20. The exposure system as claimed in claim 18, further comprising:

an additional image formation module for generating an exposure image of the first wavelength, configured to illuminate the build volume from a direction different from the direction from which the first image formation module illuminates the build volume.

21. The exposure system as claimed in claim 18, wherein the optics comprise a plurality of objectives configured to create an effective numerical aperture larger than the numerical aperture of each of the objectives separately; and the sequence of exposure images comprises exposure images for each of the plurality of objectives associated with the same depth and the processor is configured to provide the respective exposure images to the respective objectives.

22. The exposure system as claimed in claim 18, wherein the optics comprise an objective configured to move between a plurality of positions relative to the build volume to create an effective numerical aperture larger than the numerical aperture of the objective; and the sequence of exposure images comprises exposure images for a plurality of positions of the objective associated with the same depth and the processor is configured to provide the respective exposure image when the objective is positioned in the respective position.

\* \* \* \* \*